US012723864B2

(12) United States Patent
Kitagawa

(10) Patent No.: US 12,723,864 B2
(45) Date of Patent: Sep. 1, 2026

(54) BALANCED HETERODYNE LASER INTERFEROMETER WITH OPTICAL AXIS SHIFT

(71) Applicant: SEIKO EPSON CORPORATION, Tokyo (JP)

(72) Inventor: Jun Kitagawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 225 days.

(21) Appl. No.: 17/950,193

(22) Filed: Sep. 22, 2022

(65) Prior Publication Data

US 2023/0288184 A1 Sep. 14, 2023

(30) Foreign Application Priority Data

Sep. 24, 2021 (JP) ................................ 2021-155247

(51) Int. Cl.
*G01B 9/02001* (2022.01)
*G02B 27/12* (2006.01)
*G02B 27/30* (2006.01)

(52) U.S. Cl.
CPC ......... *G01B 9/02007* (2013.01); *G02B 27/12* (2013.01); *G02B 27/30* (2013.01)

(58) Field of Classification Search
CPC .. G01H 9/00; G01B 9/02007; G01B 9/02003; G01B 9/02045; G01B 9/02002; G01B 9/02083; G01B 9/02
See application file for complete search history.

(56) References Cited

U.S. PATENT DOCUMENTS 6,403,966 B1 * 6/2002 Oka ........................ G02B 21/16 250/372
8,217,302 B2 * 7/2012 Alpay .................. B23K 26/046 219/121.72

(Continued)

FOREIGN PATENT DOCUMENTS

CN 1749733 A 3/2006
CN 103034109 A 4/2013

(Continued)

OTHER PUBLICATIONS

Hui, R., & O'Sullivan, M. (2009). Fiber-Optic Measurement Techniques. Academic Press. Chapter 3. (Year: 2009).*

(Continued)

*Primary Examiner* — Tarifur R Chowdhury
*Assistant Examiner* — Paul Schnase
(74) *Attorney, Agent, or Firm* — Harness, Dickey & Pierce, P.L.C.

(57) ABSTRACT

A laser interferometer includes a laser light source, a first light splitter splitting the laser light into first and second split lights, an optical modulator modulating the first split light into reference light, a second light splitter reflecting part of interference light to generate third split light and transmitting the other part of the interference light to generate fourth split light, and first and second light receiving elements receiving the third and fourth split lights. An optical axis of the first split light is shifted from an optical axis of the reference light. A difference between an optical path length of the third split light from the second light splitter to the first light receiving element and an optical path length of the fourth split light from the second light splitter to the second light receiving element is 20 mm or less.

18 Claims, 16 Drawing Sheets

(56) References Cited

U.S. PATENT DOCUMENTS

| | | | | |
|---|---|---|---|---|
| 9,062,957 | B2 * | 6/2015 | Yamada | G01B 9/02007 |
| 2006/0055939 | A1 | 3/2006 | Akiba et al. | |
| 2006/0280395 | A1 * | 12/2006 | Risser | G02F 1/0316 385/40 |
| 2013/0090564 | A1 | 4/2013 | Tateishi et al. | |
| 2013/0222790 | A1 * | 8/2013 | Hirao | G01J 3/4535 356/451 |
| 2022/0065614 | A1 * | 3/2022 | Yamada | G01P 3/366 |

FOREIGN PATENT DOCUMENTS

| | | | |
|---|---|---|---|
| JP | H05-240602 | A | 9/1993 |
| JP | H08-035810 | A | 2/1996 |
| JP | H10-148505 | A | 6/1998 |
| JP | 2007-285898 | A | 11/2007 |
| JP | 5244973 | B2 | 7/2013 |

OTHER PUBLICATIONS

R. Paschotta, article on "Acousto-optic Modulators" in the RP Photonics Encyclopedia, archived Dec. 15, 2019, https://doi.org/10.61835/az1 (Year: 2019).*

* cited by examiner

| POSITION | $x_{LD}$ | O | L |
|---|---|---|---|
| LIGHT DIAMETER (EMITTED LIGHT L1) | $R_{LD}$ | R | |
| LIGHT DIAMETER (RETURN LIGHT L5) | | R' | |

*FIG. 15*

OSCILLATION CIRCUIT

DEMODULATION CIRCUIT

FIG. 26

BALANCED HETERODYNE LASER INTERFEROMETER WITH OPTICAL AXIS SHIFT

The present application is based on, and claims priority from JP Application Serial Number 2021-155247, filed Sep. 24, 2021, the disclosure of which is hereby incorporated by reference herein in its entirety.

BACKGROUND

1. Technical Field

The present disclosure relates to a laser interferometer.

2. Related Art

JP-A-2007-285898 (Patent Literature 1) is an example of the related art. Patent Literature 1 discloses a laser vibrometer serving as a device that measures a vibration speed of an object. In this laser vibrometer, an object to be measured is irradiated with laser light, and a vibration speed is measured based on scattered laser light subjected to a Doppler shift.

Specifically, the laser vibrometer disclosed in Patent Literature 1 includes an acousto-optic modulator (AOM). The acousto-optic modulator shifts a frequency of the laser light by changing a frequency of supplied ultrasonic waves. In the laser vibrometer, the laser light whose frequency is shifted is used as reference light. Then, scattered laser light derived from the object to be measured and the reference light derived from the acousto-optic modulator are superimposed to extract a beat frequency. A vibration speed of the object to be measured is calculated based on the beat frequency extracted in this manner.

In a laser light source, a laser oscillation may become unstable due to entry of return light. When a laser oscillation becomes unstable in the laser vibrometer disclosed in Patent Literature 1, quality of the laser light deteriorates. As a result, in the laser vibrometer, a signal-to-noise ratio (an S/N ratio) of a light reception signal obtained by receiving the scattered laser light is reduced, or phases of laser light emitted from the laser light source are discontinuous. As a result, measurement accuracy of a vibration speed of an object may be reduced.

SUMMARY

A laser interferometer according to an application example of the present disclosure includes:

- a laser light source configured to emit laser light;
- a first light splitter configured to split the laser light into first split light and second split light;
- an optical modulator configured to modulate the first split light into reference light having a different frequency;
- a second light splitter configured to split the reference light and object light generated by an object to be measured reflecting the second split light into third split light and fourth split light;
- a first light receiving element configured to receive the third split light; and
- a second light receiving element disposed at a position different from the first light receiving element and configured to receive the fourth split light, in which
- an optical axis of the first split light that travels from the first light splitter toward the optical modulator is shifted from an optical axis of the reference light that travels from the optical modulator toward the first light splitter, and
- a difference between an optical path length from the second light splitter to the first light receiving element and an optical path length from the second light splitter to the second light receiving element is 20 mm or less.

BRIEF DESCRIPTION OF THE DRAWINGS

FIG. 2 is a schematic configuration diagram showing a sensor head unit 51 shown in FIG. 1.

FIG. 14 is a schematic diagram showing a light track of emitted light L1 (first split light L1*a*) emitted from a laser light source shown in FIG. 2 and a light track in a case where the reference light L2 generated by reflecting the emitted light L1 by the optical modulator is directed to the laser light source as return light L5.

FIG. 15 is a schematic configuration diagram showing a sensor head unit of a laser interferometer according to a first modification.

FIG. 26 is a schematic configuration diagram showing an optical system provided in the laser interferometer according to a third modification.

DESCRIPTION OF EXEMPLARY EMBODIMENTS

Hereinafter, a laser interferometer according to an aspect of the present disclosure will be described in detail based on embodiments shown in the accompanying drawings.

1. First Embodiment

First, a laser interferometer according to a first embodiment will be described.

Figure 1:
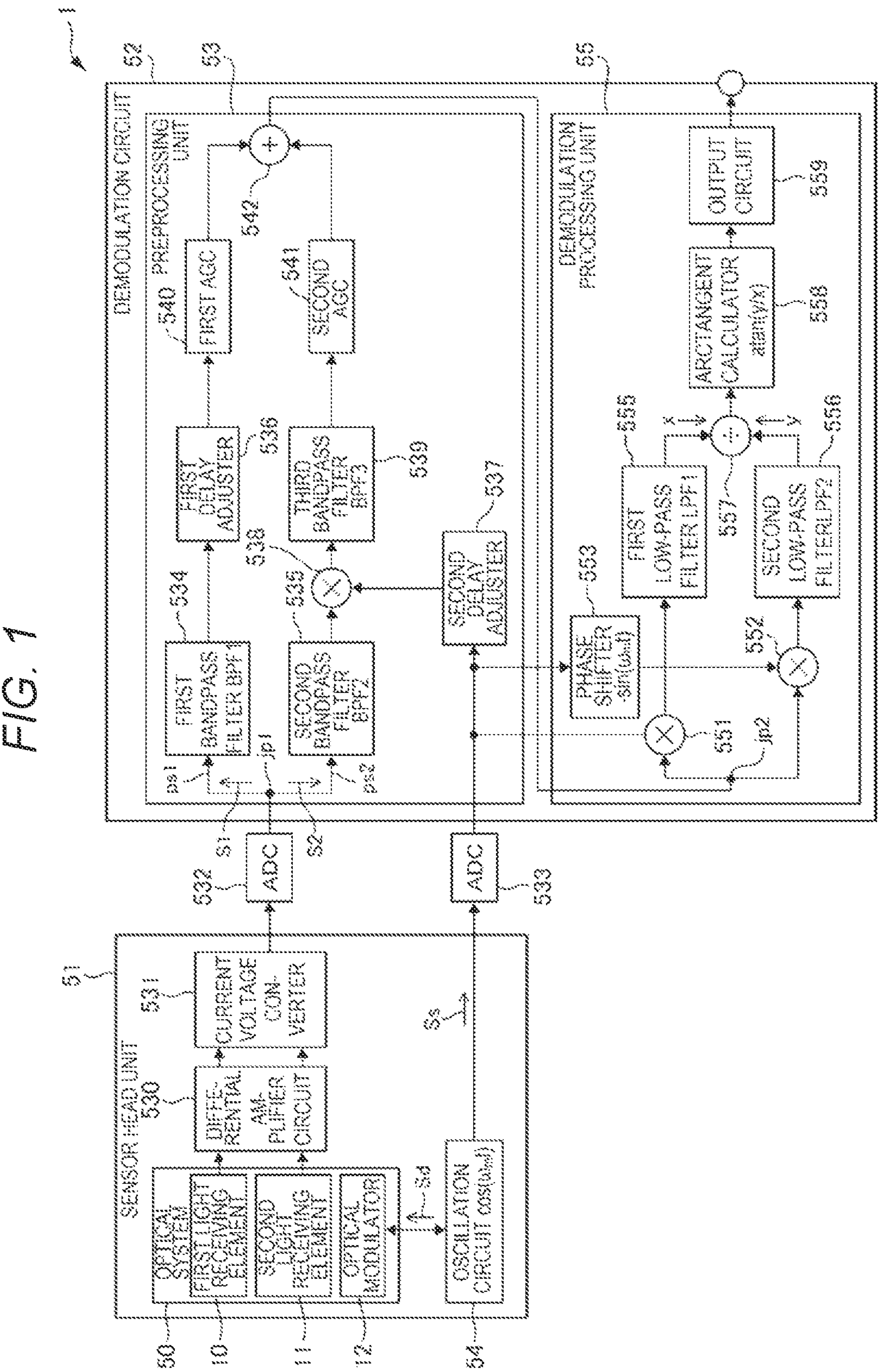
FIG. 1 is a functional block diagram showing a laser interferometer according to a first embodiment.

FIG. 1 is a functional block diagram showing a laser interferometer 1 according to the first embodiment.

The laser interferometer 1 shown in FIG. 1 includes a sensor head unit 51 and a demodulation circuit 52 to which a light reception signal from an optical system 50 is input. The sensor head unit 51 includes the optical system 50, a differential amplifier circuit 530, a current voltage converter 531, and an oscillation circuit 54.

1.1. Sensor Head Unit

Figure 2:
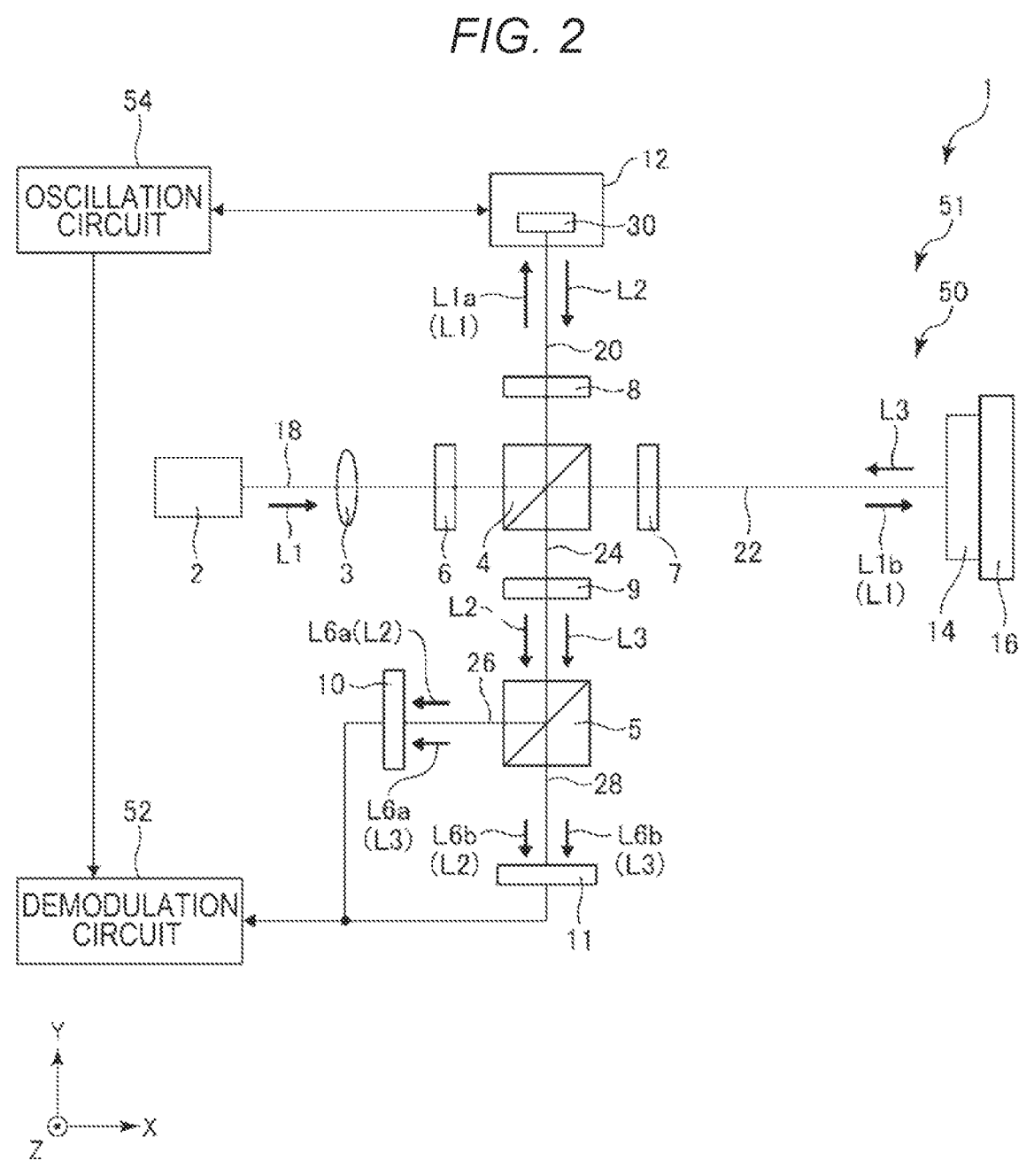

FIG. 2 is a schematic configuration diagram showing the sensor head unit 51 shown in FIG. 1. In FIG. 2, an X axis, a Y axis, and a Z axis are set as three axes orthogonal to one another, and are indicated by arrows. A tip end side of an arrow is defined as "plus", and a base end side of an arrow is defined as "minus". FIG. 2 is a diagram (a plan view) as viewed from the Z axis.

1.1.1. Optical System

As described above, the sensor head unit 51 includes the optical system 50.

As shown in FIG. 2, the optical system 50 includes a laser light source 2, a collimator lens 3, a first light splitter 4, a second light splitter 5, a half-wavelength plate 6, a quarter-wavelength plate 7, a quarter-wavelength plate 8, an analyzer 9, a first light receiving element 10, a second light receiving element 11, an optical modulator 12 of a frequency shifter type, and a setting unit 16 in which an object to be measured 14 is disposed.

The laser light source 2 emits emitted light L1 (laser light). The first light receiving element 10 and the second light receiving element 11 are photodetectors to convert received light into an electric signal. The optical modulator 12 includes a resonator element 30, and changes a frequency of the emitted light L1 to generate reference light L2 including a modulation signal. The setting unit 16 may be provided as needed, and the object to be measured 14 can be disposed in the setting unit. The emitted light L1 incident on the object to be measured 14 is reflected as object light L3 including a sample signal which is a Doppler signal derived from the object to be measured 14.

An optical path of the emitted light L1 emitted from the laser light source 2 is referred to as an optical path 18. On the optical path 18, the collimator lens 3 and the half-wavelength plate 6 are arranged in this order from a laser light source 2 side. The optical path 18 is connected to an optical path 20 by light reflected by the first light splitter 4. On the optical path 20, the quarter-wavelength plate 8 and the optical modulator 12 are arranged in this order from a first light splitter 4 side. The optical path 18 is connected to an optical path 22 by light transmitted through the first light splitter 4. On the optical path 22, the quarter-wavelength plate 7 and the setting unit 16 are arranged in this order from a first light splitter 4 side.

The optical path 20 is connected to an optical path 24 by light transmitted through the first light splitter 4. On the optical path 24, the analyzer 9 and the second light splitter 5 are arranged in this order from a first light splitter 4 side. The optical path 24 is split into an optical path 26 and an optical path 28 by the second light splitter 5. The optical path 26 extends between the second light splitter 5 and the first light receiving element 10. The optical path 28 extends between the second light splitter 5 and the second light receiving element 11.

The emitted light L1 emitted from the laser light source 2 is split into two light beams by the first light splitter 4, and one of the two light beams is incident on the optical modulator 12 through the optical path 20. The other one of the two light beams is incident on the object to be measured 14 through the optical path 22. The reference light L2 generated by the optical modulator 12 is incident on the second light splitter 5 through the optical path 20 and the optical path 24. The object light L3 generated by light reflected by the object to be measured 14 is incident on the second light splitter 5 through the optical path 22 and the optical path 24.

The reference light L2 and the object light L3 are split into two light beams by the second light splitter 5, one of the two light beams is incident on the first light receiving element 10 through the optical path 26, and the other one of the two light beams is incident on the second light receiving element 11 through the optical path 28.

An "optical path" in the present specification indicates a path that is provided between optical components and through which light travels. An "optical axis" to be described later indicates a central axis of a light beam passing through an optical path.

Hereinafter, each unit of the optical system 50 will be further described.

1.1.1.1. Laser Light Source

The laser light source 2 is a laser light source that emits the emitted light L1 having coherence. A light source having a line width of a band of MHz or less may be used as the laser light source 2. Specific examples of the laser light source 2 include a gas laser such as a He—Ne laser, and a semiconductor laser element such as a distributed feedback-laser diode (DFB-LD), a fiber bragg grating laser diode (FBG-LD), a vertical cavity surface emitting laser (VCSEL) diode, and a Fabry-Perot laser diode (FP-LD).

In particular, the laser light source 2 is preferably a semiconductor laser element. Accordingly, it is possible to reduce a size of the laser light source 2 in particular. Therefore, it is possible to reduce a size of the laser interferometer 1. In particular, in the laser interferometer 1, since a size and a weight of the sensor head unit 51 in which the optical system 50 is accommodated are reduced, it is also useful in that operability of the laser interferometer 1 is improved.

1.1.1.2. Collimator Lens

The collimator lens 3 is a convex lens disposed between the laser light source 2 and the first light splitter 4. The collimator lens 3 collimates the emitted light L1 emitted from the laser light source 2.

In a case where the emitted light L1 emitted from the laser light source 2 is sufficiently collimated, for example, when a gas laser such as a He—Ne laser is used as the laser light source 2, the collimator lens 3 may be omitted.

On the other hand, when the laser light source 2 is a semiconductor laser element, the laser interferometer 1 preferably includes the collimator lens 3 disposed between the laser light source 2 and the first light splitter 4. Accordingly, the emitted light L1 emitted from the semiconductor laser element can be collimated. As a result, since the emitted light L1 becomes collimated light, it is possible to prevent an increase in sizes of various optical components that receive the emitted light L1, and it is possible to reduce the size of the laser interferometer 1.

When the emitted light L1 that became collimated light passes through the half-wavelength plate 6, the emitted light L1 is converted into linearly polarized light having an intensity ratio of P-polarized light to S-polarized light of, for example, 50:50, and is incident on the first light splitter 4.

1.1.1.3. Light Splitter

The first light splitter 4 is a polarization beam splitter that is disposed between the laser light source 2 and the optical modulator 12 and is disposed between the laser light source 2 and the object to be measured 14. The first light splitter 4 has a function of transmitting P-polarized light and reflecting S-polarized light. With such a function, the first light splitter 4 splits the emitted light L1 into first split light L1*a* that is light reflected by the first light splitter 4 and second split light Lib that is light transmitted through the first light splitter 4.

The first split light L1*a* that is S-polarized light reflected by the first light splitter 4 is converted into circularly polarized light by the quarter-wavelength plate 8, and is incident on the optical modulator 12. The circularly polarized light of the first split light L1*a* that is incident on the optical modulator 12 is subjected to a frequency shift of $f_m$ [Hz] and is reflected as the reference light L2. Therefore, the reference light L2 includes a modulation signal of a frequency $f_m$ [Hz]. The reference light L2 is converted into P-polarized light again when the reference light L2 passes through the quarter-wavelength plate 8. The P-polarized light of the reference light L2 is transmitted through the first light splitter 4 and the analyzer 9 and is incident on the second light splitter 5.

The second split light Lib that is P-polarized light transmitted through the first light splitter 4 is converted into circularly polarized light by the quarter-wavelength plate 7 and is incident on the object to be measured 14 in a moving state. The circularly polarized light of the second split light L1*b* incident on the object to be measured 14 is subjected to a Doppler shift of $f_d$ [Hz] and is reflected as the object light L3. Therefore, the object light L3 includes a sample signal of a frequency $f_d$ [Hz]. The object light L3 is converted into S-polarized light again when the object light L3 passes through the quarter-wavelength plate 7. The S-polarized light of the object light L3 is reflected by the first light splitter 4, transmitted through the analyzer 9, and incident on the second light splitter 5.

As described above, since the emitted light L1 has coherence, the reference light L2 and the object light L3 are incident on the first light receiving element 10 and the second light receiving element 11 as interference light.

The second light splitter 5 is a polarization beam splitter that is disposed between the analyzer 9 and the first light receiving element 10 and the second light receiving element 11. The second light splitter 5 splits the interference light (the reference light L2 and the object light L3) into third split light L6*a* and fourth split light L6*b*. Specifically, S-polarized light of the interference light is reflected by the second light splitter 5 and is incident on the first light receiving element 10 as the third split light L6*a*. P-polarized light of the interference light is transmitted through the second light splitter 5 and is incident on the second light receiving element 11 as the fourth split light L6*b*.

A non-polarization beam splitter may be used instead of the polarization beam splitter. In this case, since the half-wavelength plate 6, the quarter-wavelength plate 7, the quarter-wavelength plate 8, and the like are not necessary, it is possible to reduce the size of the laser interferometer 1 by reducing the number of components. In addition, a light splitter other than the beam splitter may be used.

1.1.1.4. Analyzer

Since the S-polarized light and the P-polarized light orthogonal to each other are independent of each other, a beat due to interference does not appear by simply superimposing the S-polarized light and the P-polarized light. Therefore, light waves obtained by superimposing the S-polarized light and the P-polarized light pass through the analyzer 9 in a manner of being inclined by 45° relative to both the S-polarized light and the P-polarized light. Since the analyzer 9 is used, light components common to each other can be transmitted and interference can be caused. As a result, in the analyzer 9, the reference light L2 and the object light L3 interfere with each other, and interference light having a frequency of $|f_m - f_d|$ [Hz] is generated.

1.1.1.5. Light Receiving Element

The third split light L6*a* is incident on the first light receiving element 10. The fourth split light L6*b* is incident on the second light receiving element 11 disposed at a position different from a position of the first light receiving element 10. The third split light L6*a* and the fourth split light L6*b* are the interference light described above. The first light receiving element 10 and the second light receiving element 11 receive the interference light and output a light reception signal. A sample signal is demodulated from the light reception signal using a method to be described later, so that a movement of the object to be measured 14, that is, a vibration speed and a displacement can be finally obtained. Examples of the first light receiving element 10 and the second light receiving element 11 include a photodiode.

The first light receiving element 10 receives the third split light L6*a* and outputs a photocurrent. The second light receiving element 11 receives the fourth split light L6*b* and outputs a photocurrent. The differential amplifier circuit 530 to be described later calculates a difference between the photocurrent from the first light receiving element 10 and the photocurrent from the second light receiving element 11, and outputs the difference as a differential current. The current voltage converter 531 to be described later converts the differential current into a voltage signal.

1.1.1.6. Optical Modulator

Figure 3:
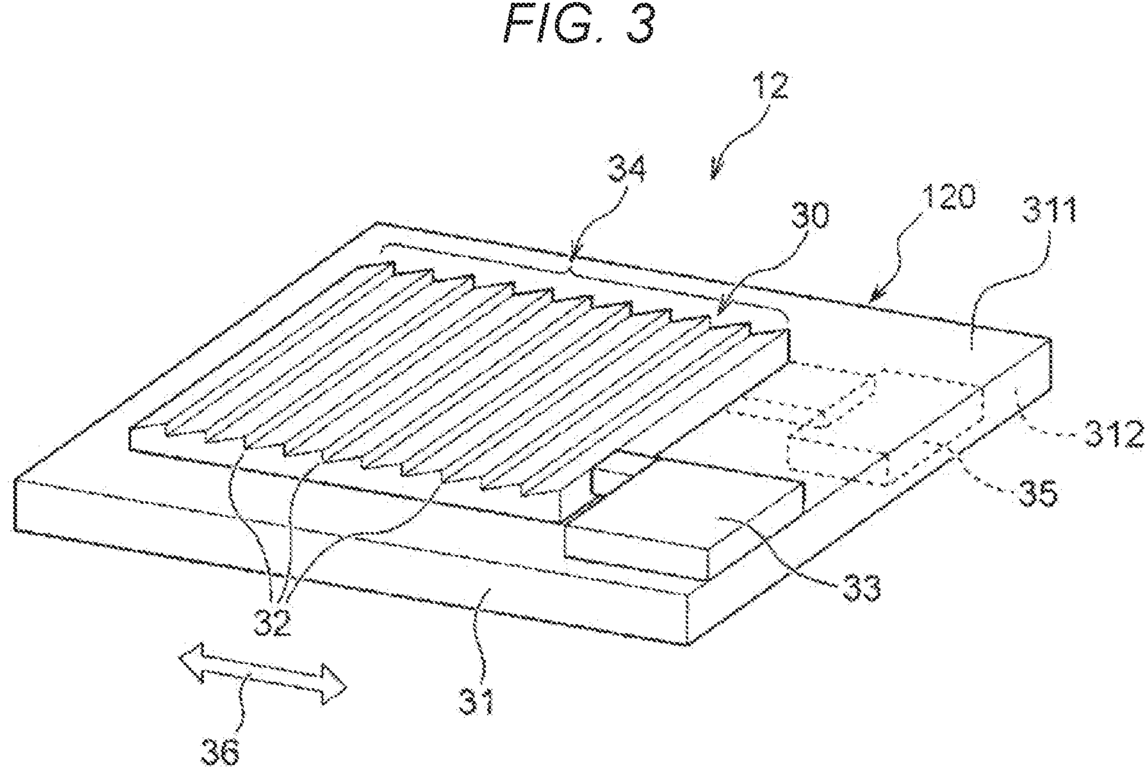
FIG. 3 is a perspective view showing a first configuration example of an optical modulator shown in FIG. 2.

FIG. 3 is a perspective view showing a first configuration example of the optical modulator 12 shown in FIG. 2.

1.1.1.6.1. Overview of First Configuration Example of Optical Modulator

The optical modulator 12 of a frequency shifter type includes an optical modulation resonator 120. The optical modulation resonator 120 shown in FIG. 3 includes a plate-shaped resonator element 30 and a substrate 31 that supports the resonator element 30.

The resonator element 30 is made of a material that repeats a mode in which the resonator element 30 vibrates so as to be distorted in a direction along a surface by applying a potential. In the present configuration example, the resonator element 30 is a quartz crystal AT resonator that performs thickness shear vibration along a vibration direction 36 in a high frequency region of an MHz band. A diffraction grating 34 is formed on a front surface of the resonator element 30. The diffraction grating 34 has a plurality of grooves 32 having a component intersecting the vibration direction 36, that is, a plurality of linear grooves 32 extending in a direction intersecting the vibration direction 36.

The substrate 31 has a front surface 311 and a back surface 312 that have a front and back relationship relative to each other. The resonator element 30 is disposed on the front surface 311. A pad 33 for applying a potential to the resonator element 30 is provided on the front surface 311. In addition, a pad 35 for applying a potential to the resonator element 30 is provided on the back surface 312.

A long side of the substrate 31 is, for example, about 0.5 mm or more and 10.0 mm or less. A thickness of the substrate 31 is, for example, about 0.10 mm or more and 2.0 mm or less. For example, a shape of the substrate 31 is a square having a side of 1.6 mm and a thickness of 0.35 mm.

A long side of the resonator element 30 is, for example, about 0.2 mm or more and 3.0 mm or less. A thickness of the resonator element 30 is, for example, about 0.003 mm or more and 0.5 mm or less.

For example, a shape of the resonator element 30 is a square having a side of 1.0 mm and a thickness of 0.07 mm. In this case, the resonator element 30 oscillates at a basic oscillation frequency of 24 MHz. The oscillation frequency can be adjusted in a range of 1 MHz to 1 GHZ by changing a thickness of the resonator element 30 or considering an overtone.

Although the diffraction grating 34 is formed on the entire front surface of the resonator element 30 in FIG. 3, the diffraction grating 34 may be formed only on a part of the front surface of the resonator element 30.

A magnitude of an optical modulation performed by the optical modulator 12 is determined by an inner product of a vector of the resonator element 30 in the vibration direction 36 and a difference wavenumber vector between a wavenumber vector of the emitted light L1 that is incident on the optical modulator 12 and a wavenumber vector of the reference light L2 emitted from the optical modulator 12. Although the resonator element 30 performs a thickness shear vibration in the present configuration example, since this vibration is an in-plane vibration, even when light is incident perpendicularly to the front surface of the resonator element 30 alone, an optical modulation cannot be performed. Therefore, the diffraction grating 34 is provided on the resonator element 30 in the present configuration example, so that an optical modulation can be performed by a principle to be described later.

The diffraction grating 34 shown in FIG. 3 is a blazed diffraction grating. The blazed diffraction grating refers to a diffraction grating having stepwise cross sectional shape. The linear grooves 32 of the diffraction grating 34 are provided such that an extending direction of the linear grooves 32 is orthogonal to the vibration direction 36.

When a drive signal Sd is supplied (an AC voltage is applied) from the oscillation circuit 54 shown in FIGS. 1 and 2 to the resonator element 30 shown in FIG. 3, the resonator element 30 oscillates. Power (drive power) required for the oscillation of the resonator element 30 is not particularly limited, and is as small as about 0.1 μM to 100 mW. Therefore, the drive signal Sd output from the oscillation circuit 54 can be used to cause the resonator element 30 to oscillate without amplifying the drive signal Sd.

Since an optical modulator in the related art may require a structure for maintaining a temperature of the optical modulator, it is difficult to reduce a volume of the optical modulator. An optical modulator in the related art has a problem in that it is difficult to reduce a size and power consumption of a laser interferometer because of large power consumption. In contrast, since a volume of the resonator element 30 is fairly small and power required for the oscillation of the resonator element 30 is small, a size and power consumption of the laser interferometer 1 can be easily reduced in the present configuration example.

1.1.1.6.2. Method of Forming Diffraction Grating

A method of forming the diffraction grating 34 is not particularly limited, and examples of the method include a method in which a mold is formed using a mechanical wire type (a routing engine) method, and the grooves 32 are formed on an electrode film-formed on the front surface of the resonator element 30 of a quartz crystal AT resonator using a nanoimprinting method. Here, a reason why the grooves 32 are formed on the electrode is that a high-quality thickness shear vibration can be caused on the electrode in principle in the case of a quartz crystal AT resonator. The grooves 32 are not limited to being formed on the electrode, and may be formed on a front surface of a material of a non-electrode portion. In addition, instead of the nanoimprinting method, a processing method by exposure and etching, an electron beam lithography method, a focused ion beam (FIB) processing method, or the like may be used.

The diffraction grating may be formed of a resist material on a chip of a quartz crystal AT resonator, and a metal film or a mirror film formed of a dielectric multilayer film may be provided on the diffraction grating. Reflectance of the diffraction grating 34 can be increased by providing the metal film or the mirror film.

Further, a resist film may be formed on a chip or a wafer of a quartz crystal AT resonator, processed by etching, then the resist film is removed, and thereafter a metal film or a mirror film may be formed on a surface to be processed. In this case, since the resist material is removed, an influence of moisture absorption or the like of the resist material can be eliminated, and chemical stability of the diffraction grating 34 can be improved. Further, a metal film having high conductivity such as Au or Al is provided, so that the metal film can also be used as an electrode for driving the resonator element 30.

The diffraction grating 34 may be formed using a technique such as anodized alumina (porous alumina).

1.1.1.6.3. Other Configuration Example of Optical Modulator

The resonator element 30 is not limited to a quartz crystal resonator, and may be, for example, a Si resonator, a surface acoustic wave (SAW) device, and a ceramic resonator.

Figure 4:
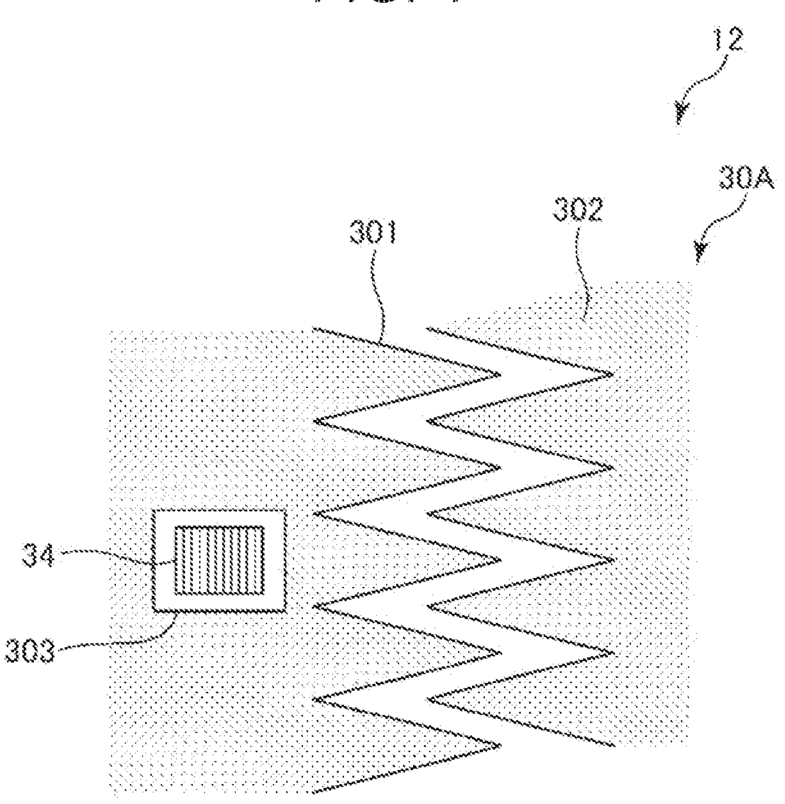
FIG. 4 is a plan view showing a part of a second configuration example of the optical modulator.
Figure 5:
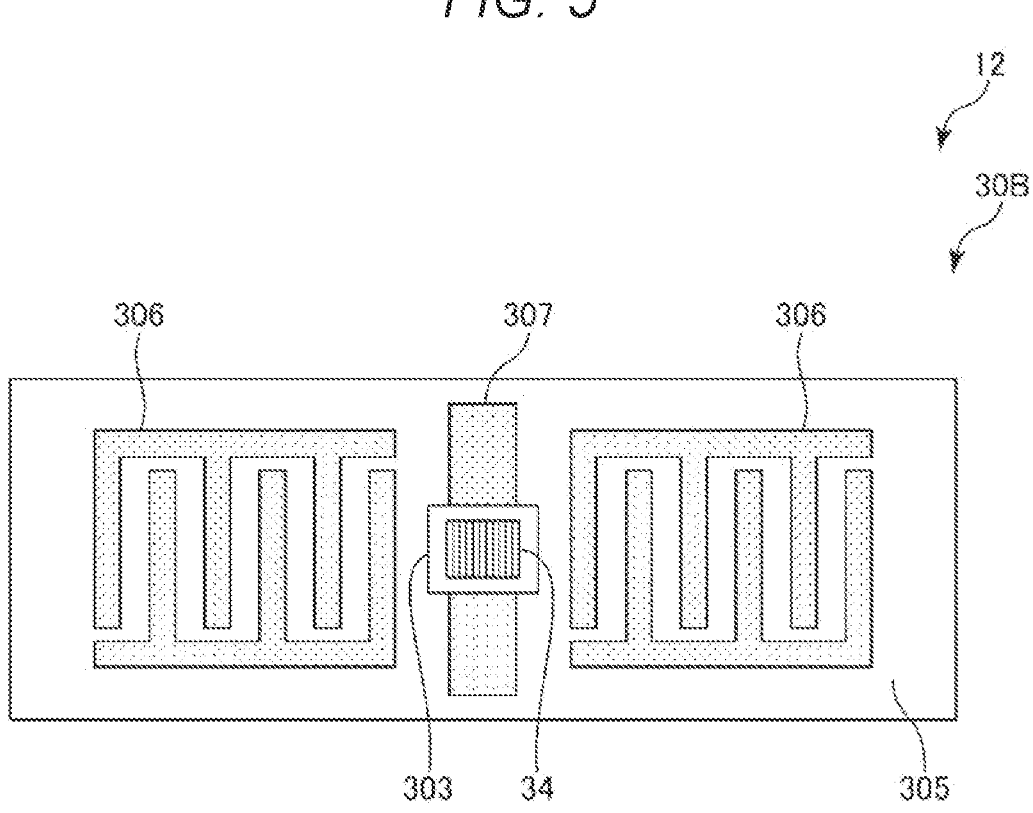
FIG. 5 is a plan view showing a third configuration example of the optical modulator.

FIG. 4 is a plan view showing a part of a second configuration example of the optical modulator 12. FIG. 5 is a plan view showing a third configuration example of the optical modulator 12.

A resonator element 30A shown in FIG. 4 is a Si resonator manufactured from a Si substrate using a MEMS technique. The MEMS refers to a micro electro mechanical system.

The resonator element 30A includes a first electrode 301 and a second electrode 302 that are adjacent to each other on the same plane with a gap between the first electrode 301 and the second electrode 302, a diffraction grating mounting portion 303 provided on the first electrode 301, and the diffraction grating 34 provided on the diffraction grating mounting portion 303. For example, the first electrode 301 and the second electrode 302 vibrate using electrostatic attraction as a drive force so as to repeatedly come close to and separate from each other in a left-right direction in FIG. 4, that is, along an axis that connects the first electrode 301 and the second electrode 302 shown in FIG. 4. Accordingly, an in-plane vibration can be applied to the diffraction grating 34. An oscillation frequency of the Si resonator is, for example, about 1 kHz to several hundreds of MHz.

A resonator element 30B shown in FIG. 5 is an SAW device using surface waves. The SAW refers to surface acoustic waves.

The resonator element 30B includes a piezoelectric substrate 305, a comb-shaped electrode 306 provided on the piezoelectric substrate 305, a ground electrode 307, the diffraction grating mounting portion 303, and the diffraction grating 34. When an AC voltage is applied to the comb-shaped electrode 306, surface acoustic waves are excited by an inverse piezoelectric effect. Accordingly, an in-plane vibration can be applied to the diffraction grating 34. An oscillation frequency of the SAW device is, for example, about several hundreds of MHz to several GHz.

In the device described above, it is also possible to perform an optical modulation by a principle to be described later by providing the diffraction grating 34 in a similar manner to the case of a quartz crystal AT resonator.

On the other hand, when the resonator element 30 is a quartz crystal resonator, a highly accurate modulation signal can be generated using a fairly high Q value of the quartz crystal. The Q value is an index indicating sharpness of a resonance peak. In addition, the quartz crystal resonator has a feature that the quartz crystal resonator is less likely to be affected by disturbance. Therefore, a sample signal derived from the object to be measured 14 can be acquired with high accuracy by using a modulation signal modulated by the optical modulator 12 including a quartz crystal resonator.

1.1.1.6.4. Optical Modulation by Resonator Element

Next, a principle of modulating light using the resonator element 30 will be described.

Figure 6:
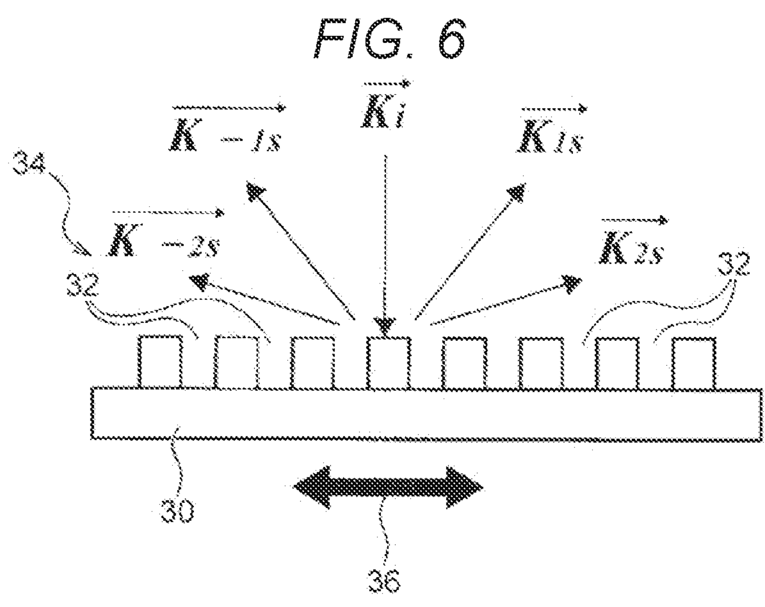
FIG. 6 is a conceptual diagram showing that a plurality of diffracted light beams are generated when incident light $K_i$ is incident from a direction perpendicular to a front surface of a resonator element.

FIG. 6 is a conceptual diagram showing that a plurality of diffracted light beams are generated when incident light $K_i$ is incident from a direction perpendicular to the front surface of the resonator element 30.

As shown in FIG. 6, when the incident light $K_i$ is incident on the diffraction grating 34 that performs a thickness shear vibration along the vibration direction 36, a plurality of diffracted light beams $K_{ns}$ are generated due to a diffraction phenomenon. n is an order of the diffracted light $K_{ns}$, and n=0, ±1, ±2, and the like. The diffraction grating 34 shown in FIG. 6 does not show the blazed diffraction grating shown in FIG. 3 but shows a diffraction grating formed by repeating irregularities as an example of another diffraction grating. Illustration of a diffracted light beam Kos is omitted in FIG. 6.

Although the incident light $K_i$ is incident from a direction perpendicular to the front surface of the resonator element 30 in FIG. 6, an incident angle of the incident light $K_i$ is not particularly limited. Alternatively, the incident angle may be set such that the incident light $K_i$ is obliquely incident on the front surface of the resonator element 30. When the incident light $K_{ns}$ is obliquely incident, a traveling direction of the diffracted light $K_{ns}$ also changes accordingly.

Depending on a design of the diffraction grating 34, high-order light of $|n|\geq 2$ may not appear. Therefore, it is desirable to set $|n|=1$ in order to stably obtain a modulation signal. That is, in the laser interferometer 1 shown in FIG. 2, the optical modulator 12 of a frequency shifter type may be disposed such that ±1 diffracted light beams are used as the reference light L2. With such an arrangement, measurement by the laser interferometer 1 can be stabilized.

On the other hand, when high-order light of $|n|\geq 2$ appears from the diffraction grating 34, the optical modulator 12 may be disposed such that any diffracted light beam of ±2 or higher is used as the reference light L2 instead of the ±1 diffracted light beams. As a result, high-order diffracted light can be used, so that the laser interferometer 1 can be made higher in frequency and smaller in size.

In the present embodiment, for example, the optical modulator 12 is configured such that an angle formed by an entering direction of the incident light $K_i$ that is incident on the optical modulator 12 and a traveling direction of the reference light L2 emitted from the optical modulator 12 is 180°. Hereinafter, three examples will be described with reference to FIGS. 7 to 9.

Figure 7:
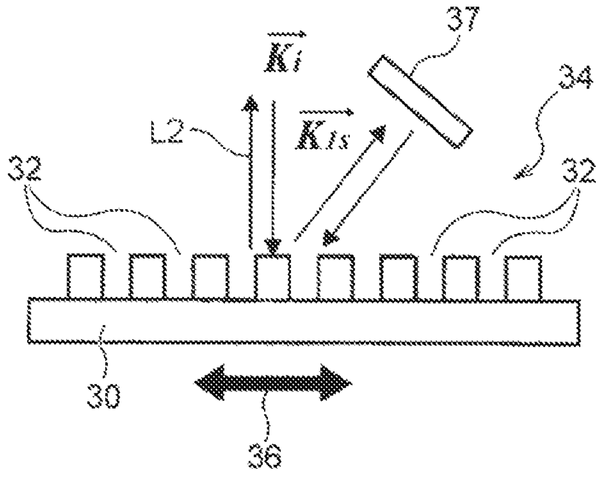
FIG. 7 is a conceptual diagram showing the optical modulator configured such that an angle formed by a traveling direction of the incident light $K_i$ and a traveling direction of reference light L2 is 180°.
Figure 8:
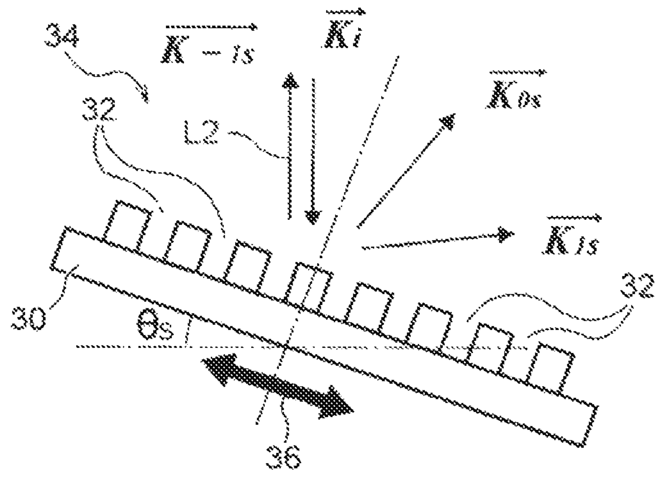
FIG. 8 is a conceptual diagram showing the optical modulator configured such that the angle formed by the traveling direction of the incident light $K_i$ and the traveling direction of the reference light L2 is 180°.
Figure 9:
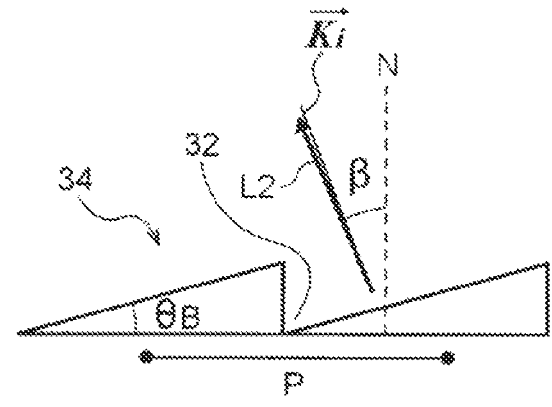
FIG. 9 is a conceptual diagram showing the optical modulator configured such that the angle formed by the traveling direction of the incident light $K_i$ and the traveling direction of the reference light L2 is 180°.

FIGS. 7 to 9 are conceptual diagrams showing the optical modulator 12 configured such that an angle formed by a traveling direction of the incident light $K_i$ and the traveling direction of the reference light L2 is 180°.

The optical modulator 12 shown in FIG. 7 includes a mirror 37 in addition to the resonator element 30. The mirror 37 is disposed in a manner of reflecting a diffracted light $K_{1s}$ and returning the diffracted light $K_{1s}$ to the diffraction grating 34. At this time, an angle formed by an incident angle of the diffracted light $K_{1s}$ relative to the mirror 37 and a reflection angle of the diffracted $K_{1s}$ reflected by the mirror 37 is 180°. As a result, the diffracted light $K_{1s}$ emitted from the mirror 37 and returned to the diffraction grating 34 is diffracted again by the diffraction grating 34 and travels in a direction opposite to the traveling direction of the incident light $K_i$ that is incident on the optical modulator 12. Therefore, it is possible to satisfy the above-described condition that the angle formed by the entering direction of the incident light $K_i$ and the traveling direction of the reference light L2 is 180° by providing the mirror 37.

Since the diffracted light $K_{1s}$ is reflected by the mirror 37 in this manner, the reference light L2 generated by the optical modulator 12 is subjected to a frequency modulation twice. Therefore, it is possible to perform a frequency modulation at a higher frequency by using the mirror 37 in combination as compared with a case of using the resonator element 30 alone.

In FIG. 8, the resonator element 30 is inclined as compared with an arrangement in FIG. 6. An inclination angle $\theta_S$ at this time is set so as to satisfy the above-described condition that an angle formed by the entering direction of the incident light $K_i$ and the traveling direction of the reference light L2 is 180°.

The diffraction grating 34 shown in FIG. 9 is a blazed diffraction grating having a blaze angle $\theta_B$. When the incident light $K_i$ traveling at an incident angle β relative to a normal line N of the front surface of the resonator element 30 is incident on the diffraction grating 34, the reference light L2 returns at the same angle as the blaze angle $\theta_B$ relative to the normal line N. Therefore, it is possible to satisfy the above-described condition that an angle formed by entering direction of the incident light $K_i$ and the traveling direction of the reference light L2 is 180° by setting the incident angle β equal to the blaze angle $\theta_B$. In this case, since the above-described condition can be satisfied without using the mirror 37 shown in FIG. 7 and without inclining the resonator element 30 as shown in FIG. 8, it is possible to further reduce the size of the laser interferometer 1 and increase a frequency of the laser interferometer 1. In particular, in a case of a blazed diffraction grating, an arrangement satisfying the above condition is referred to as a "Littrow arrangement", and there is an advantage in that a diffraction efficiency of diffracted light can be particularly increased.

A pitch P in FIG. 9 represents a pitch of a blazed diffraction grating, and for example, the pitch P is 1 μm. The blaze angle $\theta_B$ is, for example, 25°. In this case, the incident angle β relative to the normal line N of the incident light $K_i$ may also be set to 25° in order to satisfy the above-described condition.

1.1.1.6.5. Package Structure

Figures 10, 11:
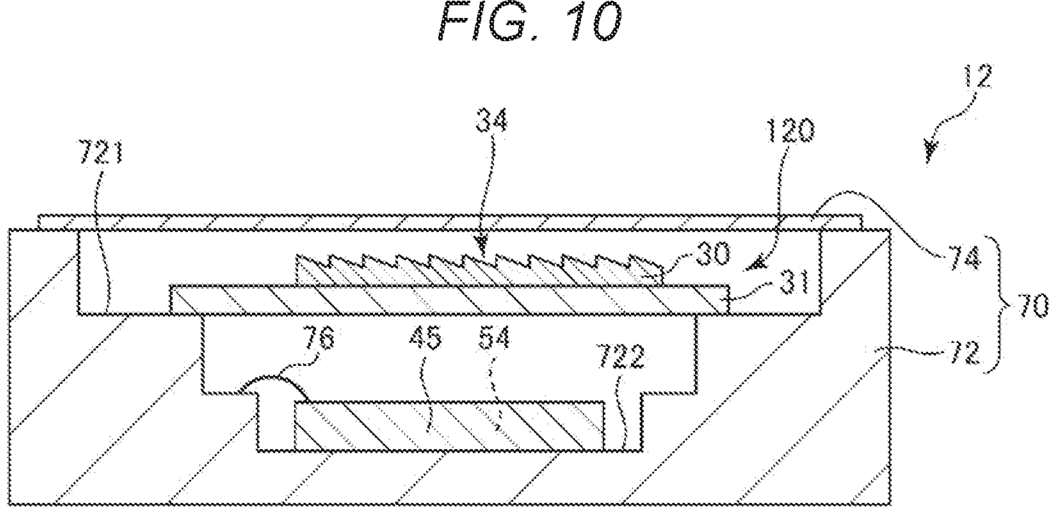
FIG. 10 is a cross sectional view showing the optical modulator having a package structure.
FIG. 11 is a circuit diagram showing a configuration example of a differential amplifier circuit and a current voltage converter shown in FIG. 1.

FIG. 10 is a cross sectional view showing the optical modulator 12 having a package structure.

The optical modulator 12 shown in FIG. 10 includes a container 70 serving as a housing, the optical modulation resonator 120 accommodated in the container 70, and a circuit element 45 forming the oscillation circuit 54. The container 70 is hermetically sealed in, for example, a depressurized atmosphere such as vacuum or an inert gas atmosphere such as nitrogen or argon.

As shown in FIG. 10, the container 70 includes a container body 72 and a lid 74. The container body 72 includes a first recessed portion 721 provided inside the container body 72 and a second recessed portion 722 that is provided inside the first recessed portion 721 and that is deeper than the first recessed portion 721. The container body 72 is formed of a ceramic material, a resin material, or the like. Although not shown, the container body 72 includes an internal terminal provided on an inner surface, an external terminal provided on an outer surface, a wire that couples the internal terminal and the external terminal, and the like.

An opening of the container body 72 is closed by the lid 74 via a sealing member such as a seal ring or low melting point glass (not shown). Examples of constituent materials of the lid 74 include a material capable of transmitting laser light such as a glass material.

The optical modulation resonator 120 is disposed on a bottom surface of the first recessed portion 721. The optical modulation resonator 120 is supported on the bottom surface of the first recessed portion 721 by a bonding member (not shown). The internal terminal of the container body 72 and the optical modulation resonator 120 are electrically coupled to each other via a conductive material (not shown) such as a bonding wire or a bonding metal.

The circuit element 45 is disposed on a bottom surface of the second recessed portion 722. The circuit element 45 is electrically coupled to the internal terminal of the container body 72 via a bonding wire 76. Accordingly, the optical modulation resonator 120 and the circuit element 45 are also electrically coupled to each other via a wire provided in the container body 72. The circuit element 45 may be provided in a circuit other than the oscillation circuit 54 to be described later.

By adopting such a package structure, since the optical modulation resonator 120 and the circuit element 45 can overlap with each other, a physical distance between the optical modulation vibrator 120 and the circuit element 45 can be reduced, and a wire length between the optical modulation resonator 120 and the circuit element 45 can be shortened. Therefore, it is possible to prevent a noise from entering the drive signal Sd from the outside, or conversely, it is possible to prevent the drive signal Sd from becoming a noise source. In addition, both the optical modulation resonator 120 and the circuit element 45 can be protected from the external environment by one container 70. Therefore, it is possible to improve reliability of the laser interferometer 1 while reducing the size of the sensor head unit 51.

A structure of the container 70 is not limited to the structure show in the drawings, and, for example, the optical modulation resonator 120 and the circuit element 45 may have separate package structures. Although not shown, other circuit elements provided in the oscillation circuit 54 may be accommodated in the container 70. The container 70 may be provided as needed, and may be omitted.

The optical modulator 12 is not limited to an optical modulator including the resonator element 30 as described above, and may be, for example, an acousto-optic modulator (AOM) and an electro-optic modulator (EOM). When the AOM or the EOM is applied to the optical modulator 12, a light reflection function may be added to the AOM or the EOM.

1.1.2. Differential Amplifier Circuit and Current Voltage Converter

FIG. 11 is a circuit diagram showing a configuration example of the differential amplifier circuit 530 and the current voltage converter 531 shown in FIG. 1.

As described above, each of the first light receiving element 10 and the second light receiving element 11 is, for example, a photodiode, and has a cathode and an anode.

The differential amplifier circuit 530 shown in FIG. 11 includes a coupling wire 530*a* that couples the anode of the first light receiving element 10 and the cathode of the second light receiving element 11, and a coupling wire 530*b* that couples the cathode of the first light receiving element 10 and the anode of the second light receiving element 11. The differential amplifier circuit 530 performs a differential amplification processing of obtaining a difference between a photocurrent I1 from the first light receiving element 10 and a photocurrent I2 from the second light receiving element 11, and outputs the difference as a differential current Id.

The current voltage converter 531 shown in FIG. 11 includes a first input terminal 531*a*, a second input terminal 531*b*, an operational amplifier 531*c*, a feedback resistor 531*d*, and an output terminal 531*e*.

The coupling wire 530*a* is coupled to the first input terminal 531*a*, and the coupling wire 530*b* is coupled to the second input terminal 531*b*.

The first input terminal 531*a* is coupled to an inverting input terminal of the operational amplifier 531*c*. The second input terminal 531*b* is coupled to a non-inverting input terminal of the operational amplifier 531*c*. The second input terminal 531*b* and the non-inverting input terminal of the operational amplifier 531*c* are coupled to a reference potential such as a ground potential.

The feedback resistor 531*d* is coupled between an output terminal and the inverting input terminal of the operational amplifier 531*c*. The feedback resistor 531*d* performs a negative feedback and converts a current into a voltage. Since the negative feedback is performed by the feedback resistor 531*d*, a potential difference between the inverting input terminal and the non-inverting input terminal of the operational amplifier 531*c* is substantially zero. As a result, a so-called imaginary short circuit (virtual short circuit) is developed.

The output terminal 531*e* is coupled to an output terminal of the operational amplifier 531*c*.

The current voltage converter 531 is also called a transimpedance amplifier (TIA), converts the differential current Id input to the first input terminal 531*a* into a voltage signal, and outputs the voltage signal from the output terminal 531*e* as a light reception signal.

Since the differential amplifier circuit 530 described above is provided, it is possible to increase a signal-to-noise ratio (S/N ratio) in the light reception signal output from the current voltage converter 531 or a calculation result of a calculation using the light reception signal.

Specifically, the differential amplifier circuit 530 can perform a differential processing of obtaining a difference between the photocurrent I1 from the first light receiving element 10 and the photocurrent I2 from the second light receiving element 11, and output the difference as the differential current Id. According differential processing, DC components of the photocurrents I1 and I2 are canceled out or reduced. Therefore, the differential current Id contains substantially no DC component. As a result, a conversion gain in the current voltage converter 531 can be increased, and the S/N ratio of the light reception signal can be increased. In addition, when the demodulation circuit 52 to be described later performs a calculation of amplifying an AC signal included in the light reception signal, it is not necessary to consider a DC component. As a result, calculation accuracy can be increased, and an S/N ratio of a calculation result can be increased.

Further, an amplitude of the differential current Id is larger than amplitudes of the photocurrents I1 and I2. That is, the differential amplifier circuit 530 performs an amplification processing on the photocurrent I1 and the photocurrent I2, and outputs an amplified differential current Id. Therefore, a light reception signal having a high S/N ratio can be obtained by using the differential current Id.

Noises (common mode noises) corresponding to a wire length are mixed in the coupling wires 530*a* and 530*b*. The noises are often mixed in both of the coupling wires 530*a* and 530*b* at the same phase. Therefore, the noises are canceled or reduced by performing the differential processing. As a result, the S/N ratio of the light reception signal can be increased.

Alternatively, a configuration of the differential amplifier circuit 530 is not limited to the configuration described above. For example, after the photocurrents I1 and I2 are converted into voltage signals independently of each other, a phase of one of the voltage signals may be inverted, and then a differential voltage between the two voltage signals may be calculated, and a calculation result may be used as the light reception signal.

An ADC 532 shown in FIG. 1 is disposed between the current voltage converter 531 and the demodulation circuit 52. The ADC 532 is an analog-to-digital converter, and converts an analog signal into a digital signal with a predetermined number of sampling bits.

1.1.3. Oscillation Circuit

As shown in FIG. 1, the oscillation circuit 54 outputs the drive signal Sd to be input to the optical modulator 12 of the optical system 50. In addition, the oscillation circuit 54 outputs a reference signal Ss to be input to the demodulation circuit 52.

Figure 12:
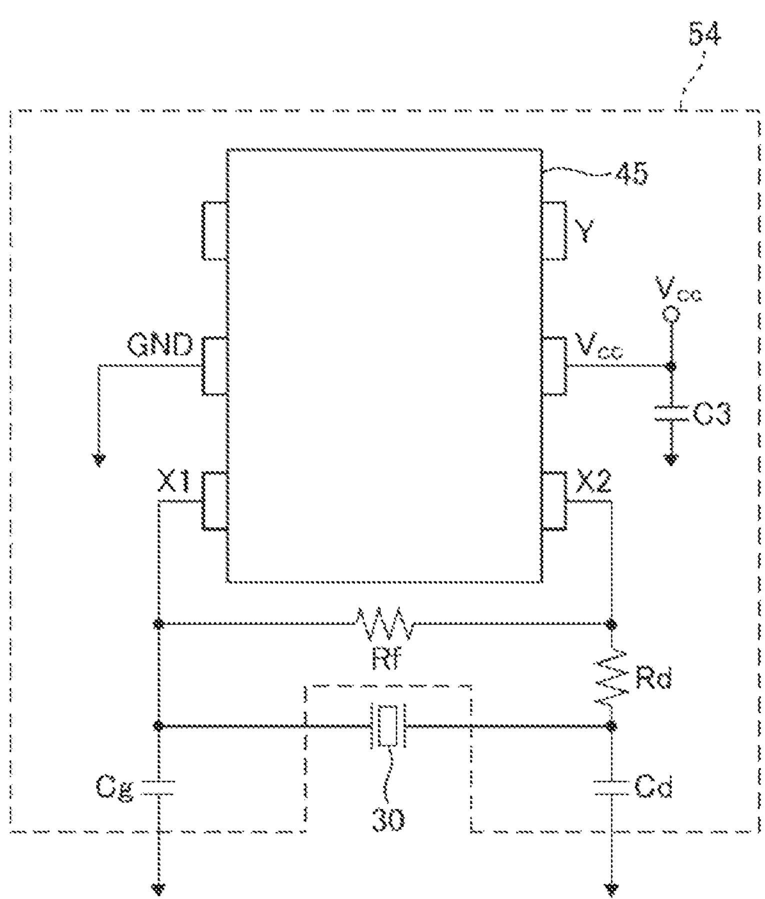
FIG. 12 is a circuit diagram showing a configuration of a single-stage inverter oscillation circuit.

The oscillation circuit 54 is not particularly limited as long as the oscillation circuit 54 is a circuit capable of oscillating the resonator element 30, and circuits having various configurations can be used as the oscillation circuit 54. FIG. 12 is a circuit diagram showing a configuration of a one-stage inverter oscillation circuit as an example of a circuit configuration.

The oscillation circuit 54 shown in FIG. 12 includes the circuit element 45, a feedback resistor Rf, a limiting resistor Rd, a first capacitor Cg, a second capacitor Cd, and a third capacitor C3.

The circuit element 45 is an inverter IC. A terminal X1 and a terminal X2 of the circuit element 45 are terminals coupled to an inverter inside the circuit element 45. A terminal GND is coupled to a ground potential, and a terminal Vcc is coupled to a power supply potential. A terminal Y is a terminal for oscillation output.

The first capacitor Cg is coupled between the terminal X1 and the ground potential. The limiting resistor Rd and the second capacitor Cd that are coupled in series to each other are coupled between the terminal X2 and the ground potential in this order from a terminal X2 side. One end of the feedback resistor Rf is coupled between the terminal X1 and the first capacitor Cg, and the other end of the feedback resistor Rf is coupled between the terminal X2 and the limiting resistor Rd.

One end of the resonator element 30 is coupled between the first capacitor Cg and the feedback resistor Rf, and the other end of the resonator element 30 is coupled between the second capacitor Cd and the limiting resistor Rd. Accordingly, the resonator element 30 serves as a signal source of the oscillation circuit 54.

Figure 13:
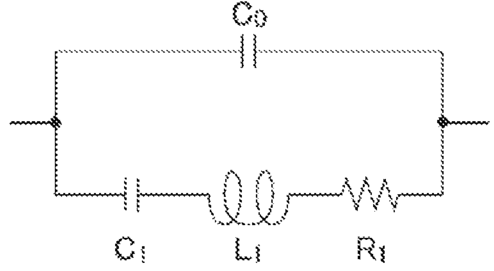
FIG. 13 is an example of an LCR equivalent circuit of a resonator element.

FIG. 13 is an example of an LCR equivalent circuit of the resonator element 30.

As shown in FIG. 13, the LCR equivalent circuit of the resonator element 30 includes a series capacitance $C_1$, a series inductance $L_1$, an equivalent series resistance $R_1$, and a parallel capacitance $C_0$.

In the oscillation circuit 54 shown in FIG. 12, a load capacitance $C_L$ is calculated by the following Formula (a), in which a capacitance of the first capacitor Cg is defined as $C_g$ and a capacitance of the second capacitor Cd is defined as $C_d$.

$$C_L = \frac{C_d C_g}{C_d + C_g} \tag{a}$$

Then, an oscillation frequency $f_{osc}$ output from the terminal Y of the oscillation circuit 54 is calculated by the following Formula (b).

$$f_{osc} = f_Q \sqrt{1 + \frac{C_1}{C_0 + C_L}} \tag{b}$$

$f_Q$ is a natural frequency of the resonator element 30.

According to the Formula (b), it can be seen that the oscillation frequency $f_{osc}$ of a signal output from the terminal Y can be finely adjusted by appropriately changing the load capacitance $C_L$.

A difference Δf between the natural frequency $f_Q$ of the resonator element 30 and the oscillation frequency $f_{osc}$ of the oscillation circuit 54 is calculated by the following Formula (c).

$$\Delta f = f_{osc} - f_Q = f_Q\left(\sqrt{1 + \frac{C_1}{C_0 + C_L}} - 1\right) \tag{c}$$

Here, since $C_1 \ll C_0$, and $C_1 \ll C_L$, Δf can be substantially calculated by the following Formula (d).

$$\Delta f = f_{osc} - f_Q \cong \frac{C_1}{2(C_0 + C_L)} f_Q \tag{d}$$

Therefore, the oscillation frequency $f_{osc}$ of the oscillation circuit 54 has a value corresponding to the natural frequency $f_Q$ of the resonator element 30.

Here, for example, when the resonator element 30 is fixed to the container 70, the natural frequency $f_Q$ fluctuates when the resonator element 30 receives an expansion stress caused by temperature via a fixing portion. In addition, when the resonator element 30 is inclined, the natural frequency $f_Q$ fluctuates under an influence of gravity or the like due to an own weight of the resonator element 30.

In the oscillation circuit 54, when the natural frequency $f_Q$ fluctuates for such a reason, the oscillation frequency $f_{osc}$ changes in conjunction with the fluctuation based on the above-described Formula (d). That is, the oscillation frequency $f_{osc}$ constantly has a value shifted from the natural frequency $f_Q$ by $\Delta f$. Accordingly, vibration of the resonator element 30 is stabilized, and a displacement amplitude is stabilized. Since a modulation feature of the L2 is stabilized by stabilizing the optical modulator displacement amplitude, demodulation accuracy of a sample signal in the demodulation circuit 52 can be improved.

For example, it is preferable that $\Delta f=|f_{osc}-f_Q|\leq 3000$ [Hz], and more preferable that $\Delta f=|f_{osc}-f_Q|\leq 600$ [Hz].

As described above, in the laser interferometer 1 according to the present embodiment, the optical modulator 12 includes the resonator element 30, and the optical modulator 12 modulates the first split light L1*a* using the resonator element 30.

According to such a configuration, a size and a weight of the optical modulator 12 can be reduced. As a result, a size and a weight of the laser interferometer 1 can be reduced.

The laser interferometer 1 includes the demodulation circuit 52 and the oscillation circuit 54. The oscillation circuit 54 uses the resonator element 30 as a signal source and outputs the reference signal Ss to the demodulation circuit 52 as shown in FIG. 1. The demodulation circuit 52 demodulates a sample signal that is derived from the object to be measured 14 from the light reception signal based on the reference signal Ss.

According to such a configuration, even when the natural frequency $f_Q$ of the resonator element 30 fluctuates, the oscillation frequency $f_{osc}$ of the oscillation circuit 54 can be changed to a value corresponding to the natural frequency $f_Q$ of the resonator element 30, so that the vibration of the resonator element 30 can be easily stabilized. Accordingly, a temperature feature of a modulation signal can be made to correspond to a temperature feature of the resonator element 30, and a modulation feature of the optical modulator 12 can be stabilized. As a result, demodulation accuracy of the sample signal in the demodulation circuit 52 can be improved.

In the above-described configuration, a temperature feature of the reference signal Ss output from the oscillation circuit 54 to the demodulation circuit 52 can also be made to correspond to the temperature feature of the resonator element 30. In this case, since both the temperature feature of a modulation signal and the temperature feature of a reference signal correspond to the temperature feature of the resonator element 30, a behavior of a fluctuation of the modulation signal and a behavior of a fluctuation of the reference signal Ss accompanying with a temperature change coincide with or are similar to each other. Therefore, even when a temperature of the resonator element 30 changes, demodulation accuracy can be prevented from being affected, and demodulation accuracy of a sample signal derived from the object to be measured 14 can be improved.

Further, since power consumption of the oscillation circuit 54 is low, power saving of the laser interferometer 1 can be easily achieved.

For example, a signal generator such as a function generator or a signal generator may be used instead of the oscillation circuit 54.

1.2. Demodulation Circuit

The demodulation circuit 52 performs a demodulation processing of demodulating a sample signal that is derived from the object to be measured 14 from the light reception signal output from the current voltage converter 531. The sample signal includes, for example, phase information and frequency information. A displacement of the object to be measured 14 can be acquired from the phase information, and a speed of the object to be measured 14 can be acquired from the frequency information. When different physical quantities can be acquired in this manner, the laser interferometer 1 can have functions of a displacement meter and a speedometer, so that it is possible to improve functionality of the laser interferometer 1.

A circuit configuration of the demodulation circuit 52 is set in accordance with a method of a modulation processing. In the laser interferometer 1 according to the present embodiment, the optical modulator 12 including the resonator element 30 is used. Since the resonator element 30 is an element that vibrates in a simple manner, a vibration speed changes every moment in a cycle. Therefore, a modulation frequency also changes with time, and a demodulation circuit in the related art cannot be used.

The demodulation circuit in the related art refers to, for example, a circuit that demodulates a sample signal from a light reception signal including a modulation signal modulated using an acousto-optic modulator (AOM). In the acousto-optic modulator, a modulation frequency does not change. Therefore, the demodulation circuit in the related art can demodulate a sample signal from a light reception signal including a modulation signal in which a modulation frequency does not change, but cannot demodulate a sample signal including a modulation signal modulated by the optical modulator 12 in which a modulation frequency changes.

Therefore, the demodulation circuit 52 shown in FIG. 1 includes a preprocessing unit 53 and a demodulation processing unit 55. A light reception signal output from the current voltage converter 531, first, passes through the preprocessing unit 53, and then is guided to the demodulation processing unit 55. The preprocessing unit 53 executes a preprocessing on the light reception signal. A signal that can be demodulated by the demodulation circuit in the related art is obtained by the preprocessing. Therefore, the demodulation processing unit 55 demodulates a sample signal derived from the object to be measured 14 using a known demodulation method.

1.2.1. Configuration of Preprocessing Unit

The preprocessing unit 53 shown in FIG. 1 includes a first bandpass filter 534, a second bandpass filter 535, a first delay adjuster 536, a second delay adjuster 537, a multiplier 538, a third bandpass filter 539, a first AGC 540, a second AGC 541, and an adder 542. The AGC refers to auto gain control.

A light reception signal output from the current voltage converter 531 is split into a first signal S1 and a second signal S2 at a branch portion jp1. In FIG. 1, a path of the first signal S1 is referred to as a first signal path ps1, and a path of the second signal S2 is referred to as a second signal path ps2.

An ADC 533 is coupled between the oscillation circuit 54 and the second delay adjuster 537. The ADC 533 is an analog-to-digital converter, and converts an analog signal into a digital signal with a predetermined number of sampling bits.

The first bandpass filter 534, the second bandpass filter 535, and the third bandpass filter 539 are filters that selectively transmit signals in a specific frequency band.

The first delay adjuster 536 and the second delay adjuster 537 are circuits that adjust a delay of a signal. The multiplier 538 is a circuit that generates an output signal in proportion to a product of two input signals. The adder 542 is a circuit that generates an output signal in proportion to a sum of two input signals.

Next, an operation of the preprocessing unit 53 will be described along a flow of the first signal S1, the second signal S2, and the reference signal Ss.

A group delay of the first signal S1 is adjusted by the first delay adjuster 536 after the first signal S1 passes through the first bandpass filter 534 disposed on the first signal path ps1. The group delay adjusted by the first delay adjuster 536 corresponds to a group delay of the second signal S2 caused by the second bandpass filter 535 to be described later. Such a delay adjustment is performed such that delay times accompanying with signals passing through filter circuits between the first bandpass filter 534 through which the first signal S1 passes and the second bandpass filter 535 and the third bandpass filter 539 through which the second signal S2 passes can be made uniform. The first signal S1 that passed through the first delay adjuster 536 is input to the adder 542 via the first AGC 540.

The second signal S2 is input to the multiplier 538 after the second signal S2 passes through the second bandpass filter 535 disposed on the second signal path ps2. The multiplier 538 multiplies the second signal S2 by the reference signal Ss output from the second delay adjuster 537. Specifically, the reference signal Ss that is represented by cos ($\omega_m$t) and that is output from the oscillation circuit 54 is subjected to a digital conversion of the ADC 533 and a phase adjustment of the second delay adjuster 537, and is input to the multiplier 538. $\omega_m$ is an angular frequency of a signal modulated by the optical modulator 12, and t is a time. Thereafter, the second signal S2 passes through the third bandpass filter 539, and then is input to the adder 542 via the second AGC 541.

The adder 542 outputs an output signal in proportion to a sum of the first signal S1 and the second signal S2.

1.2.2. Basic Principle of Preprocessing

Next, a basic principle of the preprocessing in the preprocessing unit 53 will be described. For example, a system will be considered in the following description in which a frequency changes in a sinusoidal shape as a modulation signal and a displacement of the object to be measured 14 changes with simple vibration in an optical axis. Here, $E_m$, $E_d$, and $\varphi$ are expressed as follows.

$$E_m = a_m\{\cos(\omega_0 t + B\sin\omega_m t + \phi_m) + i\sin(\omega_0 t + B\sin\omega_m t + \phi_m)\} \quad (1)$$

$$E_d = a_d\{\cos(\omega_0 t + A\sin\omega_d t + \phi_d) + i\sin(\omega_0 t + A\sin\omega_d t + \phi_d)\} \quad (2)$$

$$\phi = \phi_m - \phi_d \quad (3)$$

A light reception signal $I_{PD}$ output from the current voltage converter 531 is theoretically expressed by the following Formula.

$$\begin{aligned} I_{PD} &= \langle |E_m + E_d|^2 \rangle \\ &= \langle |E_m^2 + E_d^2 + 2E_mE_d| \rangle \\ &= a_m^2 + a_d^2 + 2a_ma_d\cos(B\sin\omega_m t - A\sin\omega_d t + \phi) \end{aligned} \quad (4)$$

$E_m$, $E_d$, $\varphi_m$, $\varphi_d$, $\varphi$, $\omega_m$, $\omega_d$, $\omega_0$, $a_m$, and $a_d$ are expressed as follows.

$E_m$: Electric field component of modulation signal derived from optical modulator $E_d$: Electric field component of sample signal derived from object to be measured $\varphi_m$: Initial phase of modulation signal derived from optical modulator $\varphi_d$: Initial phase of sample signal derived from object to be measured $\varphi$: Optical path phase difference of laser interferometer $\omega_m$: Angular frequency of modulation signal derived from optical modulator $\omega_d$: Angular frequency of sample signal derived from object to be measured $\omega_0$: Angular frequency of emitted light emitted from light source $a_m$: Coefficient $a_d$: Coefficient In addition, < > in the Formula (4) represents a time average.

A first term and a second term in the Formula (4) represent DC components, and a third term represents an AC component. When the AC component is defined as $I_{PD \cdot AC}$, $I_{PD \cdot AC}$ satisfies the following Formula.

$$\begin{aligned} I_{PD \cdot AC} &= 2a_ma_d\cos(B\sin\omega_m t - A\sin\omega_d t + \phi) \\ &= 2a_ma_d\{\cos(B\sin\omega_m t)\cos(A\sin\omega_d t - \phi) + \sin(B\sin\omega_m t)\sin(A\sin\omega_d t - \phi)\} \end{aligned} \quad (5)$$

$$A = \frac{f_{dmax}}{f_d} \quad (6)$$

$$B = \frac{f_{mmax}}{f_m} \quad (7)$$

$A$: Phase shift of sample signal $f_{dmax}$: Doppler frequency shift of sample signal $f_d$: Frequency of sample signal $B$: Phase shift of modulation signal $f_{mmax}$: Doppler frequency shift of modulation signal $f_m$: Frequency of modulation signal Here, ν-order Bessel functions such as the following Formulas (8) and (9) are known.

$$\cos\{\zeta\sin(2\pi f_v t)\} = J_0(\zeta) + 2J_2(\zeta)\cos(2\cdot 2\pi f_v t) + 2J_4(\zeta)\cos(4\cdot 2\pi f_v t) + \cdots \quad (8)$$

$$\sin\{\zeta\sin(2\pi f_v t)\} = 2J_1(\zeta)\sin(1\cdot 2\pi f_v t) + 2J_3(\zeta)\sin(3\cdot 2\pi f_v t) + \cdots \quad (9)$$

When the above-described Formula (5) is subjected to series expansion using the Bessel functions of the Formulas (8) and (9), the Formula (5) can be transformed into the following Formula (10).

$$\begin{aligned} I_{PD.AC} = 2a_m a_d[\{J_0(B) + \\ 2J_2(B)\cos(2\cdot\omega_m t) + 2J_4(B)\cos(4\cdot\omega_m t) + \cdots\}\cos(A\sin\omega_d t - \phi) - \\ \{2J_1(B)\sin(1\cdot\omega_m t) + 2J_3(B)\sin(3\cdot\omega_m t) + \cdots\}\sin(A\sin\omega_d t - \phi)] \end{aligned} \quad (10)$$

$J_0(B)$, $J_1(B)$, $J_2(B)$ . . . are Bessel coefficients.

When such a transformation is made, theoretically, it can be said that a band corresponding to a specific order can be extracted by a bandpass filter.

Therefore, the preprocessing unit 53 executes a preprocessing on the light reception signal in the following flow based on this theory.

First, the light reception signal output from the current voltage converter 531 is split into the first signal S1 and the second signal S2 at the branch portion jp1. The first signal S1 passes through the first bandpass filter 534. A center angular frequency of the first bandpass filter 534 is set to $\omega_m$. Accordingly, the first signal S1 that passed through the first bandpass filter 534 is expressed by the following Formula.

$$\begin{aligned} I_{pass1} &= J_1(B)\{-\cos(\omega_m t + A\sin\omega_d t - \phi) + \cos(\omega_m t - A\sin\omega_d t + \phi)\} \\ &= -2J_1(B)\sin(\omega_m t)\sin(A\sin\omega_d t - \phi) \end{aligned} \quad (11)$$

On the other hand, the second signal S2 passes through the second bandpass filter 535. A center angular frequency of the second bandpass filter 535 is set to a value different from the center angular frequency of the first bandpass filter 534. Here, for example, the center angular frequency of the second bandpass filter 535 is set to $2\omega_m$. Accordingly, the second signal S2 that passed through the second bandpass filter 535 is expressed by the following Formula.

$$\begin{aligned} I_{BPF2} &= J_2(B)\cos(2\cdot\omega_m t)\cdot\cos(A\ \sin\ \omega_d t - \phi) \\ &= \frac{1}{2}J_2(B)\{\cos(2\cdot\omega_m t + \cos(A\ \sin\ \omega_d t - \phi)) + \cos(2\cdot\omega_m t - \cos(A\ \sin\ \omega_d t - \phi))\} \end{aligned} \quad (12)$$

The multiplier 538 multiplies the second signal S2 that passed through the second bandpass filter 535 by the reference signal Ss. The second signal S2 that passed through the multiplier 538 is expressed by the following Formula.

$$\begin{aligned} I_{cos(\omega_m t)} &= \frac{1}{2}J_2(B)\{\cos(2\cdot\omega_m t + A\ \sin\ \omega_d t - \phi) + \cos(2\cdot\omega_m t - A\ \sin\ \omega_d t + \phi)\}\cdot\cos(\omega_m t) \\ &= \frac{1}{2}J_2(B)\{\cos(3\cdot\omega_m t + A\ \sin\ \omega_d t - \phi) + \cos(1\cdot\omega_m t + A\ \sin\ \omega_d t - \phi) + \\ &\quad \cos(3\cdot\omega_m t - A\ \sin\ \omega_d t + \phi) + \cos(1\cdot\omega_m t - A\ \sin\ \omega_d t + \phi)\} \end{aligned} \quad (13)$$

The second signal S2 that passed through the multiplier 538 passes through the third bandpass filter 539. A central angular frequency of the third bandpass filter 539 is set to the same value as the central angular frequency of the first bandpass filter 534. Here, for example, the central angular frequency of the third bandpass filter 539 is set to $\omega_m$. Accordingly, the second signal S2 that passed through the third bandpass filter 539 is expressed by the following Formula.

$$\begin{aligned} I_{pass2} &= \frac{1}{2}J_2(B)\{\cos(\omega_m t + A\ \sin\ \omega_d t - \phi) + \cos(\omega_m t - A\ \sin\ \omega_d t + \phi)\} \\ &= J_2(B)\cos(\omega_m t)\cos(A\ \sin\ \omega_d t - \phi) \end{aligned} \quad (14)$$

Thereafter, the first delay adjuster 536 adjusts a phase of the first signal S1 expressed by the above Formula (11), and the first AGC 540 adjusts an amplitude of the first signal S1.

The second AGC 541 adjusts an amplitude of the second signal S2 expressed by the above Formula (14), and the amplitude of the second signal S2 is made equal to the amplitude of the first signal S1.

Then, the first signal S1 and the second signal S2 are added by the adder 542. An addition result is expressed by the following Formula (15).

$$I_{53}=\cos(\omega_m t+A\ \sin\ \omega_d t-\phi) \tag{15}$$

As shown in the above Formula (15), as a result of the addition, an unnecessary term disappears, and a necessary term can be extracted. The addition result is input to the demodulation processing unit 55.

1.2.3. Configuration of Demodulation Processing Unit

The demodulation processing unit 55 executes a demodulation processing of demodulating a sample signal that is derived from the object to be measured 14 from a signal output from the preprocessing unit 53. The demodulation processing is not particularly limited, and a known quadrature detection method may be used. The quadrature detection method is a method of executing the demodulation processing by performing an operation of mixing external signals orthogonal to each other with an input signal.

The demodulation processing unit 55 shown in FIG. 1 is a digital circuit including a multiplier 551, a multiplier 552, a phase shifter 553, a first low-pass filter 555, a second low-pass filter 556, a divider 557, an arctangent calculator 558, and an output circuit 559.

1.2.4. Demodulation Processing Executed by Demodulation Processing Unit

In a demodulation processing, first, a signal output from the preprocessing unit 53 is split into two signals at a branch portion jp2. The multiplier 551 multiplies one of the split signals by the reference signal Ss that is represented by cos ($\omega_m$t) and is output from the oscillation circuit 54. The multiplier 552 multiplies the other split signal by a signal that is represented by −sin ($\omega_m$t) and is obtained by the phase shifter 553 shifting a phase of the reference signal Ss output from the oscillation circuit 54 by −90°. The reference signal Ss and the signal obtained by shifting the phase of the reference signal Ss are signals whose phases are shifted from each other by 90°.

The signal that passed through the multiplier 551 passes through the first low-pass filter 555, and then is input to the divider 557 as a signal x. The signal that passed through the multiplier 552 passes through the second low-pass filter 556, and then is input to the divider 557 as a signal y. The divider 557 divides the signal y by the signal x, and an output y/x passes through the arctangent calculator 558 to obtain an output atan (y/x).

Thereafter, the output atan (y/x) passes through the output circuit 559 to calculate a phase $\varphi_d$ as information derived from the object to be measured 14. The output circuit 559 performs a phase connection when there is a phase jump of 21 at adjacent points by performing a phase unwrapping processing. Then, a displacement of the object to be measured 14 can be calculated based on the phase information. As a result, a function serving as a displacement meter is achieved. In addition, a speed can be calculated based on the displacement. As a result, a function serving as a speedometer is achieved.

A circuit configuration of the demodulation processing unit 55 has been described above, and the circuit configuration of the digital circuit is an example. The present disclosure is not limited thereto. For example, a configuration of the preprocessing unit 53 is not limited to the above-described configuration. The demodulation processing unit 55 is not limited to a digital circuit, and may be an analog circuit. The analog circuit may include an F/V converter circuit or a AC counter circuit.

In the circuit configuration of the demodulation processing unit 55 described above, frequency information derived from the object to be measured 14 may be obtained. A speed of the object to be measured 14 can be calculated based on the frequency information.

1.3. Prevention of Return Light by Optical Axis Shift

Next, prevention of return light by an optical axis shift will be described. In the following description, a "distance" refers to an optical distance (an optical path length).

The emitted light L1 emitted from the laser light source 2 is diffused by a light diffraction phenomenon. Specifically, a light diameter R of the emitted light L1 emitted from the laser light source 2 having a light diameter $R_{LD}$ is expressed by the following Formula (16) using a diffusion radiation angle θ at a position separated by a distance $x_{LD}$.

$$R=R_{LD}+\theta x_{LD} \tag{16}$$

In the Formula (16), a second term is a term of diffraction. In general, the light diffraction phenomenon is represented by the following Formula (16-1).

$$R_{LD}\sin\theta=m\lambda \tag{16-1}$$

Second and subsequent higher-order diffraction terms are fairly small, and thus are not taken into consideration. In this case, m can be set to 1. Since the diffusion radiation angle θ is generally small, θ<<1. Therefore, the Formula (16-1) can be transformed into the following Formula (16-2).

$$\theta=\frac{\lambda}{R_{LD}} \tag{16-2}$$

Then, the Formula (16) can be transformed into the following Formula (16-3).

$$R=R_{LD}+\frac{x_{LD}}{R_{LD}}\lambda \tag{16-3}$$

A light diameter R when the emitted light L1 emitted from the laser light source 2 is incident on the collimator lens 3 is calculated from the Formula (16-3).

Figure 14:
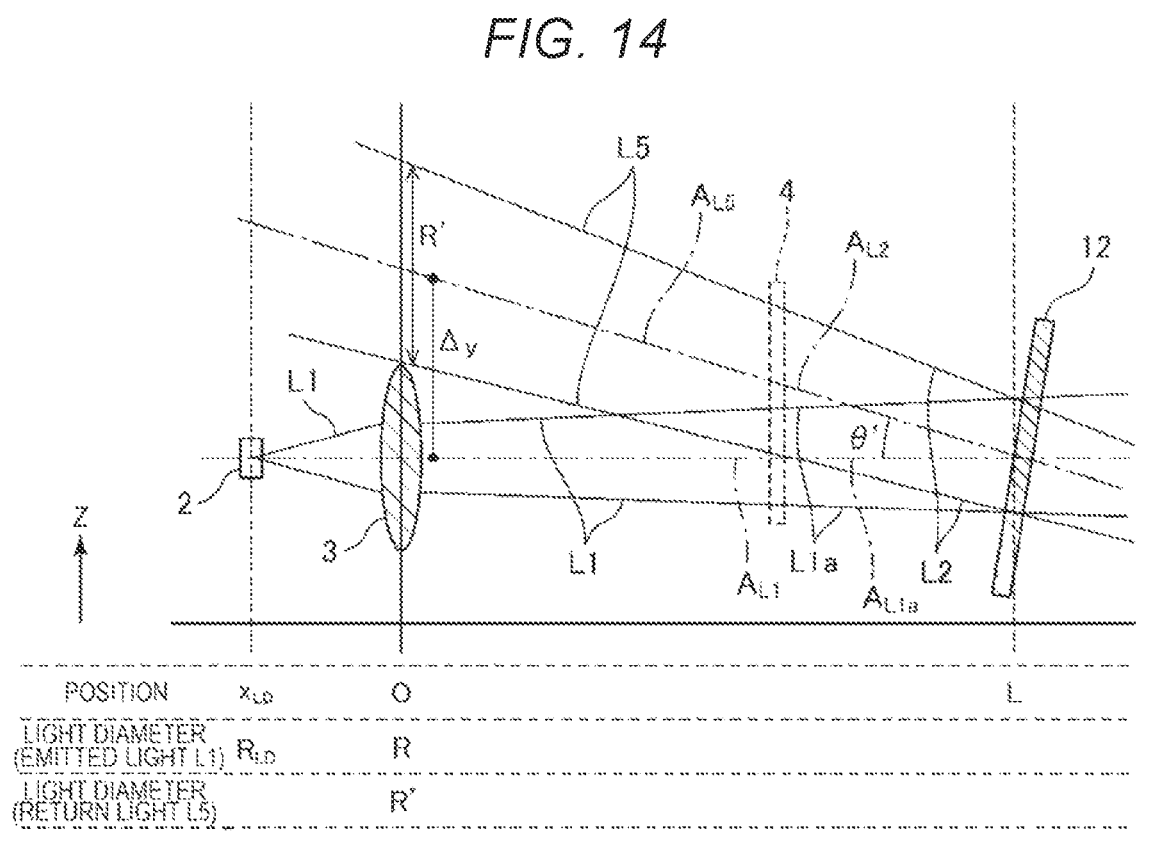

FIG. 14 is a schematic diagram showing a light track of the emitted light L1 (the first split light L1*a*) emitted from the laser light source 2 shown in FIG. 2 and a light track in a case where the reference light L2 generated by the optical modulator 12 reflecting the emitted light L1 is directed to the laser light source 2 as return light L5. In FIG. 14, an optical path refracted by the first light splitter 4 is shown in an extended manner for the convenience of illustration. Although not shown, the return light L5 may include light derived from the object light L3 in addition to the light derived from the reference light L2 shown in FIG. 14. Further, the return light L5 may include only light derived from the object light L3.

In FIG. 14, a center of the collimator lens 3 is defined as an origin O (a reference position), and a distance between the origin O and the optical modulator 12 is defined as L.

When the collimator lens 3 is omitted, a position at which the collimated emitted light L1 is generated is set as the origin O (a reference position). For example, for a gas laser such as a He—Ne laser, since the collimated emitted light L1 is emitted from an emission point, the emission point is an origin. A light diameter when the return light L5 reaches the collimator lens 3 is defined as R'.

In this case, the light diameter R' of the return light L5 is expressed by the following Formula (16-4).

$$R' = R + \frac{2L}{R}\lambda \tag{16-4}$$

In the present embodiment, an optical axis $A_{L1a}$ of the emitted light L1 (the first split light L1*a*) and an optical axis $A_{L2}$ of the reference light L2 shown in FIG. 14 are shifted from each other, so that the return light L5 is prevented from being incident on the laser light source 2. In the present specification, the fact that the optical axis $A_{L1a}$ and the optical axis $A_{L2}$ are shifted from each other is referred to as an "optical axis shift". In FIGS. 2 and 14, for example, the optical axis $A_{L2}$ is shifted in a Z axis direction relative to an optical axis of specular reflection.

The return light L5 causes destabilization of a laser oscillation in the laser light source 2. Therefore, when a light intensity of the return light L5 can be reduced by the optical axis shift, the laser oscillation can be stabilized.

The destabilization of the laser oscillation caused by the return light L5 is associated with self-mixing coupling in the laser light source 2. The self-mixing coupling is quantified by an index M that is a product of a "coupling coefficient" and a "light amount of the return light L5". The coupling coefficient is in proportion to a reciprocal of a resonator length of the laser light source 2. Therefore, the self-mixing coupling is likely to become obvious when the light amount of the return light L5 increases in a semiconductor laser element having a short resonator length. When the self-mixing coupling is prevented in the semiconductor laser element, it is considered that the self-mixing coupling is prevented in most types of light sources.

In order to prevent the self-mixing coupling in the laser light source 2, the index M preferably satisfies $M<10^{-6}$. A case where a light intensity shielding capability in the optical axis shift is expressed by an optical density (an OD value) corresponds to a case where the shielding capability satisfies OD6. When the optical axis shift has a shielding capability satisfying OD6, a laser oscillation can be stabilized.

In view of this, a light intensity $P_0$ of the emitted light L1 and a light intensity $P_r$ of the return light L5 that is not shielded due to the optical axis shift may satisfy a relationship of the following Formula (17).

$$\frac{P_r}{P_0} < 1\times10^{-6} \tag{17}$$

Therefore, a condition under which the return light L5 is not incident on the collimator lens 3 will be discussed. When the return light L5 reaches the collimator lens 3, the return light L5 becomes light having a light diameter R', and when the light does not overlap with an effective diameter of the collimator lens 3, the light intensity $P_r$ can be substantially made zero. That is, the relationship in the above-described Formula (17) is satisfied.

As a result of the optical axis shift, a shift occurs between the optical axis $A_{L1}$ of the emitted light L1 and the optical axis $A_{L5}$ of the return light L5 at a position of the collimator lens 3. In FIG. 14, a shift width between the optical axis $A_{L1}$ and the optical axis $A_{L5}$ at the collimator lens 3 is Δy [mm]. The effective diameter of the collimator lens 3 is κ [mm]. In this case, a condition for obtaining the shift width Δy in order to satisfy the relationship of the above-described Formula (17) is expressed by the following Formula (17-1).

$$\frac{\kappa}{2} + \frac{R'}{2} \leqq \Delta y \tag{17-1}$$

When the Formula is substituted into the above-described Formula (17-1), the condition for obtaining the shift width Δy is expressed by the following Formula (A).

$$\frac{\kappa}{2} + \frac{1}{2}\left(R + \frac{2L}{R}\lambda\right) \leqq \Delta y \tag{A}$$

Therefore, the shift width Δy of the optical axis shift may be selected so as to satisfy the above-described Formula (A).

Here, the shift width Δy is adjusted by inclining the optical modulator 12 as shown in FIG. 14. Specifically, in the optical system 50 shown in FIG. 14, the optical modulator 12 is inclined such that the optical axis $A_{L2}$ of the reference light L2 generated by the optical modulator 12 is shifted from the optical axis $A_{L1a}$ of the first split light L1*a* that is incident on the optical modulator 12. An angle formed by the optical axis $A_{L1a}$ of the first split light L1*a* that is incident on the optical modulator 12 and the optical axis $A_{L2}$ of the reference light L2 generated by the optical modulator 12 is defined as a shift angle θ'.

The shift width Δy is expressed by the following Formula (17-2) using the shift angle θ'.

$$\Delta y = L \tan\theta' \tag{17-2}$$

Since the shift angle θ' is generally small, θ'<<1. Therefore, the above-described Formula (17-2) can be transformed into the following Formula (17-3).

$$\Delta y \cong L\theta' \tag{17-3}$$

Therefore, in order to obtain a shift width Δy satisfying the Formula (A), the distance L and the shift angle θ' may be adjusted based on the above-described Formula (17-3).

When the shift width Δy satisfies the Formula (A), the light intensity of the return light L5 that is incident on the laser light source 2 can be sufficiently reduced. Accordingly, a laser oscillation in the laser light source 2 can be stabilized. As a result, since quality of the emitted light L1 is stabilized, it is possible to prevent a decrease in accuracy of demodulating a sample signal from the light reception signal in the demodulation circuit 52.

When the shift width Δy falls outside of a range of Formula (A), a probability that the return light L5 is incident on the collimator lens 3 increases. Therefore, the light intensity of the return light L5 that is incident on the laser light source 2 increases, and a laser oscillation may become unstable.

The shift width $\Delta y$ is appropriately adjusted according to other parameters. For example, the shift width $\Delta y$ preferably satisfies $0.10 \leq \Delta y \leq 10.0$, more preferably satisfies $0.50 \leq \Delta y \leq 10.0$, still more preferably satisfies $2.10 \leq \Delta y \leq 10.0$, and particularly preferably satisfies $2.30 \leq \Delta y \leq 10.0$. In consideration of a size of the sensor head unit 51, an upper limit value of the shift width $\Delta y$ is preferably 6.00 or less, and more preferably 3.00 or less.

When the shift width $\Delta y$ falls below the lower limit values described above, the shift angle $\theta'$ is too small, and manufacturability of the optical system 50 may decrease. On the other hand, when the shift width $\Delta y$ exceeds the upper limit values described above, it is necessary to increase sizes of the first light splitter 4 and the second light splitter 5. Therefore, it may be difficult to reduce the size of the sensor head unit 51.

In addition, the distance L between the collimator lens 3 and the optical modulator 12 is preferably 5.0 mm or more and 200 mm or less, and more preferably 10.0 mm or more and 100 mm or less. As a result, it is possible to prevent an increase in the size of the optical system 50.

1.3.1. Calculation Example 1

A calculation example 1 will be described as an example when the Formula (A) is satisfied. Parameters and a calculation result of the calculation example 1 are as shown in Table 1.

TABLE 1

| | Calculation Example 1 | Value | Unit |
|---|---|---|---|
| Parameters | Diffusion Radiation Angle $\theta$ of Emitted Light L1 | 20 | deg |
| | Wavelength $\lambda$ Emitted Light L1 | 850 | nm |
| | Light Diameter $R_{LD}$ of Laser Light Source 2 | 2.4 | μm |
| | Distance $x_{LD}$ Between Collimator Lens 3 and Laser Light Source 2 | 1.0 | mm |
| | Light Diameter R Emitted Light L1 Passing Through Collimator Lens 3 | 0.35 | mm |
| | Effective Diameter $\kappa$ of Collimator Lens 3 | 1.0 | mm |
| | Distance L Between Collimator Lens 3 and Optical Modulator 12 | 10.0 | mm |
| | Light Diameter R' of Return Light L5 in Collimator Lens 3 | 0.40 | mm |
| Calculation Result | Required Shift Width $\Delta y$ | 0.7 | mm |

In the calculation example 1, the shift width $\Delta y$ required to satisfy the Formula (A) is 0.7 mm as shown in Table 1. The shift width $\Delta y$ is a value that can be obtained even in a small optical system 50 in which the distance $x_{LD}$ corresponding to a focal length of the collimator lens 3 is about 1.0 mm and the distance L between the collimator lens 3 and the optical modulator 12 is about 10.0 mm.

Therefore, implementation of the optical system 50 satisfying the Formula (A) is ensured in the calculation example 1. Therefore, the return light L5 can be prevented from being incident on the laser light source 2 to such an extent that a laser oscillation does not become unstable.

1.3.2. Calculation Example 2

A calculation example 2 will be described as an example when the Formula (A) is satisfied. Parameters and a calculation result of the calculation example 2 are as shown in Table 2.

TABLE 2

| | Calculation Example 2 | Value | Unit |
|---|---|---|---|
| Parameters | Diffusion Radiation Angle $\theta$ of Emitted Light L1 | 20 | deg |
| | Wavelength $\lambda$ Emitted Light L1 | 850 | nm |
| | Light Diameter $R_{LD}$ of Laser Light Source 2 | 2.4 | μm |
| | Distance $x_{LD}$ Between Collimator Lens 3 and Laser Light Source 2 | 30 | mm |
| | Light Diameter R Emitted Light L1 Passing Through Collimator Lens 3 | 10.47 | mm |
| | Effective Diameter $\kappa$ of Collimator Lens 3 | 1.0 | mm |
| | Distance L Between Collimator Lens 3 and Optical Modulator 12 | 100 | mm |
| | Light Diameter R' of Return Light L5 in Collimator Lens 3 | 10.49 | mm |
| Calculation Result | Required Shift Width $\Delta y$ | 5.7 | mm |

In the calculation example 2, the shift width Δy required to satisfy the Formula (A) is 5.7 mm as shown in Table 2. The shift width Δy is a value that can be sufficiently obtained even in the optical system 50 having the size in which the distance Kan corresponding to the focal length of the collimator lens 3 is about 30 mm and the distance L between the collimator lens 3 and the optical modulator 12 is about 100 mm.

Therefore, implementation of the optical system 50 satisfying the Formula (A) is ensured in the calculation example 2. Therefore, the return light L5 can be prevented from being incident on the laser light source 2 to such an extent that a laser oscillation does not become unstable.

Figure 15:
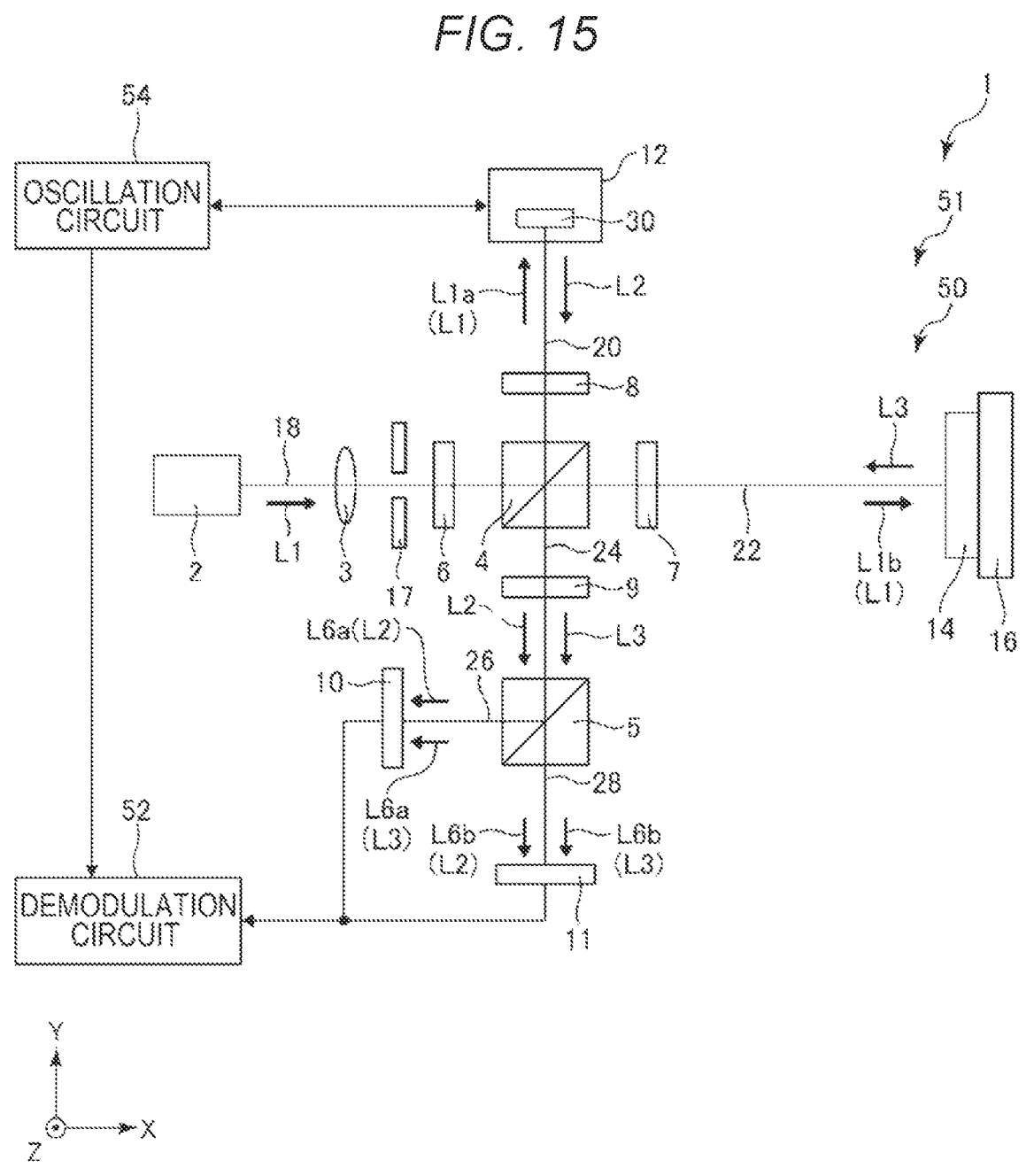
Figures 16, 17:
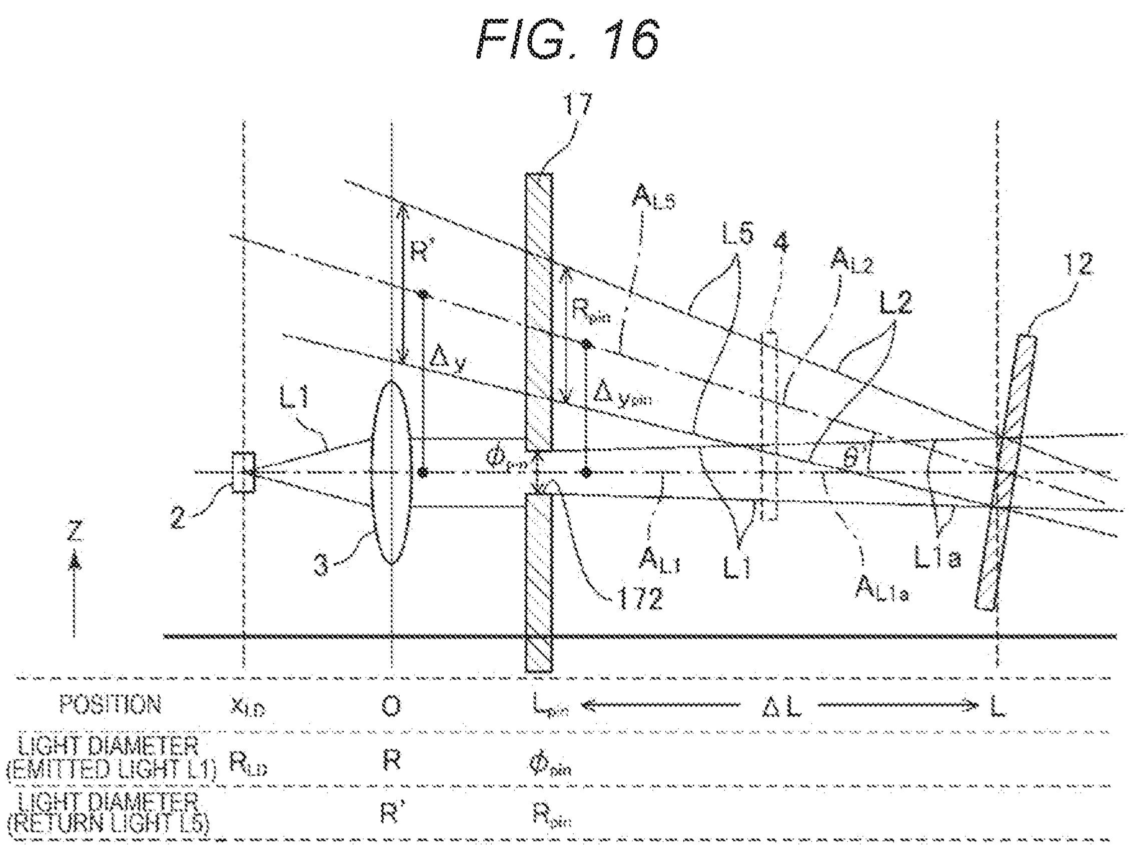
FIG. 16 is a schematic diagram showing a light track of emitted light L1 emitted from a light source shown in FIG. 15 and a light track of the first split light L1*a*, and a light track in a case where the reference light L2 generated by reflecting the first split light L1*a* by the optical modulator is directed to the laser light source as the return light L5.
FIG. 17 is a schematic diagram showing an influence of an optical axis shift on a differential amplification processing.

1.4. Preventing of Return Light by Optical Axis Shift and Light Shielding Element Next, a first modification of the optical system 50 shown in FIGS. 2 and 14 will be described. In the first modification, the return light is prevented not only by the optical axis shift but also by a combination of the optical axis shift and a light shielding element 17, FIG. 15 is a schematic configuration diagram showing the sensor head unit 51 of the laser interferometer 1 according to the first modification. FIG. 16 is a schematic diagram showing a light track of the emitted light L1 emitted from the laser light source 2 shown in FIG. 15 and a light track of the first split light L1*a*, and a light track in a case where the reference light L2 generated by the optical modulator 12 reflecting the first split light L1*a* is directed to the laser light source 2 as the return light L5.

The sensor head unit 51 shown in FIG. 15 includes the light shielding element 17 in addition to the configurations shown in FIG. 2.

The light shielding element 17 is an iris (a diaphragm) disposed between the collimator lens 3 and the first light splitter 4. The light shielding element 17 has an opening 172 provided corresponding to the optical path 18. As shown in FIG. 16, the light shielding element 17 prevents the return light L5 that is derived from the reference light L2 from being incident on the laser light source 2.

Since the light shielding element 17 only needs to have a function of shielding the return light L5, a structure of the light shielding element 17 is fairly simple. Therefore, this contributes to simplification of a structure of the laser interferometer 1. The light shielding element 17 may be a slit, a pinhole, or the like, and the structure of the light shielding element 17 is not particularly limited.

Since the light shielding element 17 is provided between the collimator lens 3 and the first light splitter 4, when a diameter $\varphi_{pin}$ of the opening 172 of the light shielding element 17 is made smaller than the light diameter R' of the return light L5, a light intensity of the return light L5 can be reduced. When the opening 172 is not a perfect circle, the diameter $\varphi_{pin}$ of the opening 172 is a diameter of a perfect circle inscribed in the opening 172.

In the present modification, the light intensity $P_0$ of the emitted light $L_1$ and the light intensity $P_r$ of the return light L5 that is not shielded by the optical axis shift and the light shielding element 17 may satisfy a relationship of the following Formula (17), $$\frac{P_r}{P_0} < 1 \times 10^{-6} \tag{17}$$

Here, a light intensity of the return light L5 immediately before being incident on the light shielding element 17 is $P'_r$. The light intensity $P'_r$ of the return light L5 is expressed by the following Formula (18). The Formula (18) is an example of a case where a light intensity distribution of the emitted light is a Gaussian distribution or a distribution according to the Gaussian distribution.

$$P'_r = P_1 \times P_2 \times P_3 \tag{18}$$

$$P_1 = P\int_{\theta}^{\frac{\phi_{pin}}{2}} \exp\left(-\frac{2r^2}{w^2}\right) r dr \tag{18-1}$$

$$w = \frac{r}{2} = \frac{\lambda}{2\theta} \tag{18-1-1}$$

$$P_1 = \frac{w^2}{4} P\left\{1 - \exp\left(-\frac{\phi_{pin}^2}{2w^2}\right)\right\} \tag{18-1-2}$$

$$P_2 = \frac{1}{2}(Refl_M + Refl_S) \tag{18-2}$$

$$P_3 = 1 - \cos^2(2\Delta\psi) \tag{18-3}$$

In the above Formula (18-1), P is a peak light intensity of the emitted light L1, r is a position in a radial direction from a central axis of the emitted light L1, and w is a distance of a position where the light intensity of the emitted light L1 is $1/e^2$ of the peak light intensity from the central axis of the emitted light L1 in the radial direction. In a case of the emitted light L1, since θ<<1, θ=λ/r. Therefore, w is expressed by the above Formula (18-1-1). In this case, the above Formula (18-1) can be transformed into the above Formula (18-1-2). In the above Formula (18-2), $Refl_M$ is a light reflectance of the optical modulator 12, and $Refl_S$ is a light reflectance of the object to be measured 14. In the above Formula (18-3), Δψ is an error in an installation angle of a half-wavelength plate that is formed in a pseudo manner by the two quarter-wavelength plates 6 and 8.

$P_1$ expressed by the above Formula (18-1) represents a light intensity of the emitted light L1 that passes through the opening 172 of the light shielding element 17. $P_2$ expressed by the above Formula (18-2) represents a reflectance of the optical modulator 12 and a reflectance of the object to be measured 14. $P_3$ expressed by the above formula (18-3) represents an intensity of light that returns to the laser light source 2 side through the first light splitter 4 when unintended polarized light is generated due to an allowable angle error of the half-wavelength plate.

Based on the above Formula (18), the light intensity $P_r$ of the return light L5 that passes through the opening 172 without being shielded by the optical axis shift or the light shielding element 17 is expressed by the following Formula (19).

$$P_r = P'_r \iint_{\text{within circle having diameter}\,\varphi_{pin}} \exp\left\{-2\frac{x^2 + (y - \Delta y)^2}{w'^2}\right\} dxdy \tag{19}$$

$$w' = \frac{1}{3}R_{pin} = \frac{\phi_{pin}}{3} + \frac{2(L - L_{pin})}{3\phi_{pin}}\lambda \tag{19-1}$$

In the above Formula (19), x and y are positions along two axes orthogonal to each other in a cross section of the return light L5. In the above Formula (19-1), $L_{pin}$ is a distance between the collimator lens 3 and the light shielding element 17. Further, in a case where a light intensity distribution of the emitted light L1 is the Gaussian distribution, when a standard deviation of the light intensity distribution is σ, w=2σ.

Therefore, the diameter op of the opening 172 of the light shielding element 17 may be selected such that the light intensity $P_r$ calculated by the above Formula (19) satisfies the Formula (17). Accordingly, the laser interferometer 1 in which a laser oscillation is stabilized can be implemented.

In the present embodiment, a diameter of the opening 172 is defined as $\varphi_{pin}$, an angle formed by the optical axis $A_{L1a}$ of the first split light L1*a* that is incident on the optical modulator 12 and the optical axis $A_{L2}$ of the reference light L2 generated by the optical modulator 12 is defined as the shift angle θ'. Further, a distance between the light shielding element 17 and the optical modulator 12 is ΔL [mm]. In this case, the laser interferometer 1 preferably satisfies the following Formula (B).

$$\frac{\lambda}{\theta'} \leqq \phi_{pin} \leqq \Delta L\theta' - \frac{\lambda}{\theta'} \tag{B}$$

$$\Delta y = L\theta' \tag{B-1}$$

$$\Delta L = L - L_{pin} \tag{B-2}$$

According to such a configuration, it is possible to increase an S/N ratio in a light reception signal while reducing the light intensity of the return light L5 that is incident on the laser light source 2 by using the optical axis shift and the light shielding element 17 in combination. Since both of the optical axis shift and the light shielding element 17 can be implemented by a simple structure, a size and a weight of the laser interferometer 1 can be easily reduced.

When the diameter Quis of the opening 172 falls below the lower limit value described above, the light intensity of the emitted light L1 that passes through the opening 172 is reduced. Accordingly, the S/N ratio in the light reception signal is lowered, and measurement accuracy of a displacement and a speed of the object to be measured 14 may be reduced. On the other hand, when the diameter $\varphi_{pin}$ of the opening 172 exceeds the upper limit value described above, the light intensity that can be reduced by the light shielding element 17 is small. Therefore, the light intensity of the return light L5 that is incident on the laser light source 2 may not be sufficiently reduced.

Here, a derivation process of the above Formula (B) will be described.

In order to prevent the return light L5 from being incident into the opening 172, a shift width $\Delta y_{pin}$ [mm] between the optical axis $A_{L1}$ of the emitted light L1 and the optical axis $A_{L5}$ of the return light L5 in the light shielding element 17 is expressed by the following Formula (19-2) based on the above Formula (17-1).

$$\frac{\phi_{pin}}{2} + \frac{R_{pin}}{2} \leqq \Delta y_{pin} \tag{19-2}$$

In the above Formula (19-2), $R_{pin}$ [mm] is a light diameter of the return light L5 in the light shielding element 17.

The light diameter $R_{pin}$ is expressed by the following Formula (19-3).

$$R_{pin} = \phi_{pin} + \frac{2(L - L_{pin})}{\phi_{pin}}\lambda \tag{19-3}$$

The shift width $\Delta y_{pin}$ is expressed by the following Formula (19-4).

$$\Delta y_{pin} = (L - L_{pin})\tan\theta' \tag{19-4}$$

Since the shift angle θ' is generally small, θ'<<1. Therefore, the above Formula (19-4) can be transformed into the following Formula (19-5).

$$\Delta y_{pin} \cong (L - L_{pin})\theta' = \Delta L\theta' \tag{19-5}$$

Therefore, in order to obtain the shift width $\Delta y_{pin}$ satisfying the above Formula (A), the distance ΔL and the shift angle θ' may be adjusted based on the above Formula (19-5).

Here, when the Formula (19-3) and the above Formula (19-5) are substituted into the Formula (19-2), the following Formula (B-3) is derived.

$$\phi_{pin} \leqq 2(L - L_{pin})\theta' - \phi_{pin} - \frac{2(L - L_{pin})}{\phi_{pin}}\lambda \tag{B-3}$$

Then, a quadratic inequality of the following Formula (B-4) is derived from the above Formula (B-3).

$$\phi_{pin}^2 - \Delta L\theta'\phi_{pin} + \Delta L\lambda \leqq 0 \tag{B-4}$$

ΔL in the above Formula (B-4) is defined by the following Formula (B-5).

$$\Delta L = (L - L_{pin}) \tag{B-5}$$

When the quadratic inequality of the above Formula (B-4) is solved, the following Formula (B-6) is derived.

$$\frac{\Delta L\theta' - \sqrt{\Delta L^2\theta'^2 - 4\Delta L\lambda}}{2} \leqq \phi_{pin} \leqq \frac{\Delta L\theta' - \sqrt{\Delta L^2\theta'^2 - 4\Delta L\lambda}}{2} \tag{B-6}$$

Here, a term expressed by the following Formula (B-7) in the above Formula (B-6) can be approximated as shown in the following Formula (B-8).

$$\sqrt{\Delta L^2\theta'^2 - 4\Delta L\lambda} = \Delta L\theta'\left(1 - \frac{4\lambda}{\Delta L\theta'^2}\right)^{1/2} \text{ when } 1 \gg \frac{4\lambda}{\Delta L\theta'^2}, \tag{B-7}$$

$$\begin{aligned}\sqrt{\Delta L^2\theta'^2 - 4\Delta L\lambda} &= \Delta L\theta'\left(1 - \frac{4\lambda}{\Delta L\theta'^2}\right) \\ &= \Delta L\theta' - \frac{2\lambda}{\theta'^2}\end{aligned} \tag{B-8}$$

When the above Formula (B-8) is used, the above Formula (B-6) can be transformed into the Formula (B) to be derived.

$$\frac{\lambda}{\theta'} \leq \phi_{pin} \leqq \Delta L\theta' - \frac{\lambda}{\theta'} \tag{B}$$

The Formula (B) is derived as described above.

The diameter $\varphi_{pin}$ [mm] of the opening 172 preferably satisfies a relationship of the following Formula (20) serving as a specific numerical range.

$$0.10 \leqq \phi_{pin} \leqq 10.0 \tag{20}$$

When the diameter $\varphi_{pin}$ of the opening 172 falls within this range, a probability of shielding the return light L5 by the light shielding element 17 increases. Accordingly, the light intensity of the return light L5 that is about to reach the laser light source 2 can be reduced, and a laser oscillation can be prevented from becoming unstable.

A distance between the optical modulator 12 and the first light receiving element 10 and a distance between the optical modulator 12 and the second light receiving element 11 are referred to as $L_{PD}$. Here, it is assumed that the distance between the optical modulator 12 and the first light receiving element 10 is equal to the distance between the optical modulator 12 and the second light receiving element 11. In this case, the laser interferometer 1 preferably satisfies the following Formula (21).

$$\Delta L - L - L_{pin} \leq L_{PD} \tag{21}$$

In the above Formula (21), L is a distance between the collimator lens 3 and the optical modulator 12. $L_{pin}$ is a distance between the collimator lens 3 and the light shielding element 17.

According to such a configuration, since the distance $L_{PD}$ can be ensured to be relatively long, a distance between the laser interferometer 1 and the object to be measured 14 that can be measured, that is, a working distance can be further increased.

The distance $L_{pin}$ between the collimator lens 3 and the light shielding element 17 is preferably 0.5 mm or more and 15.0 mm or less, and more preferably 1.0 mm or more and 10.0 mm or less. Accordingly, it is possible to effectively exhibit a function of the light shielding element 17 while preventing an increase in the size of the optical system 50.

1.4.1. Calculation Example 3

A calculation example 3 will be described as an example of calculating a range of the diameter $\varphi_{pin}$ of the opening 172 defined by the Formula (B). Parameters and a calculation result of the calculation example 3 are as shown in Table 3.

TABLE 3

| | Calculation Example 3 | Value | Unit |
|---|---|---|---|
| Parameters | Shift Width Δy of Return Light L5 in Collimator Lens 3 | 0.80 | mm |
| | Shift Angle θ' | 0.51 | deg |
| | Diffusion Radiation Angle θ of Emitted Light L1 | 20 | deg |
| | Wavelength λ of Emitted Light L1 | 050 | nm |
| | Light Diameter $R_{LD}$ of Laser Light Source 2 | 2.4 | μm |
| | Distance $x_{LD}$ Between Collimator Lens 3 and Laser Light Source 2 | 4.0 | mm |
| | Light Diameter R of Emitted Light L1 Passing Through Collimator Lens 3 | 1.40 | mm |
| | Effective Diameter κ of Collimator Lens 3 | 0.1 | mm |
| | Distance L Between Collimator Lens 3 and Optical Modulator 12 | 80.0 | mm |
| | Distance $L_{pin}$ between Collimator Lens 3 and Light shielding element 17 | 8.0 | mm |
| | Light Diameter $R_{pin}$ of Return Light L5 in Light shielding element 17 | 1.50 | mm |
| | Light Diameter R' of Return light L5 in Collimator Lens 3 | 1.51 | mm |
| | Distance ΔL between Light shielding element 17 and Optical Modulator 12 | 82 | mm |
| Calculation Result | Diameter $\varphi_{pin}$ of Opening 172 of Light shielding element 17 | 0.096 to 0.633 | mm |

In the calculation example 3, when the shift width Δy of the return light L5 in the collimator lens 3 is set to 0.80 mm and the distance $x_{LD}$ between the collimator lens 3 and the laser light source 2 is set to 4.0 mm, the return light L5 can be sufficiently shielded by setting the diameter $\varphi_{pin}$ of the opening 172 of the light shielding element 17 to 0.096 mm to 0.633 mm, as shown in Table 3. Therefore, in the calculation example 3, the return light L5 can be prevented from being incident on the laser light source 2 to such an extent that a laser oscillation does not become unstable.

1.4.2. Calculation Example 4

A calculation example 4 will be described as an example of calculating the range of the diameter $\varphi_{pin}$ of the opening 172 defined by the Formula (B). Parameters and a calculation result of the calculation example 4 are as shown in Table 4.

TABLE 4

| | Calculation Example 4 | Value | Unit |
|---|---|---|---|
| Parameters | Shift Width $\Delta y$ of Return Light L5 in Collimator Lens 3 | 0.80 | mm |
| | Shift Angle $\theta'$ | 1.53 | deg |
| | Diffusion Radiation Angle $\theta$ of Emitted Light L1 | 20 | deg |
| | Wavelength $\lambda$ of Emitted Light L1 | 050 | mm |
| | Light Diameter $R_{LD}$ of Laser Light Source 2 | 2.4 | μm |
| | Distance $x_{LD}$ Between Collimator Lens 3 and Laser Light Source 2 | 3.0 | mm |
| | Light Diameter R of Emitted Light L1 Passing Through Collimator Lens 3 | 1.05 | mm |
| | Effective Diameter $\kappa$ of Collimator Lens 3 | 0.1 | mm |
| | Distance L Between Collimator Lens 3 and Optical Modulator 12 | 30.0 | mm |
| | Distance $L_{pin}$ between Collimator Lens 3 and Light shielding element 17 | 7.0 | mm |
| | Light Diameter $R_{pin}$ of Return Light L5 in Light shielding element 17 | 1.05 | mm |
| | Light Diameter R' of Return light L5 in Collimator Lens 3 | 1.05 | mm |
| | Distance $\Delta L$ between Light shielding element 17 and Optical Modulator 12 | 23 | mm |
| Calculation Result | Diameter $\varphi_{pin}$ of Opening 172 of Light shielding element 17 | 0.032 to 0.581 | mm |

In the calculation example 4, when the shift width $\Delta y$ of the return light L5 in the collimator lens 3 is set to 0.80 mm and the distance $x_{LD}$ between the collimator lens 3 and the laser light source 2 is set to 3.0 mm, the return light L5 can be sufficiently shielded by setting the diameter own of the opening 172 of the light shielding element 17 to 0.032 mm to 0.581 mm, as shown in Table 4. Therefore, in the calculation example 4, the return light L5 can be prevented from being incident on the laser light source 2 to such an extent that a laser oscillation does not become unstable.

1.4.3. Calculation Example 5

Next, a calculation example 5 will be described as an example of a case where the light intensity $P_r$ calculated according to the above Formula (19) satisfies the above Formula (17). Parameters and a calculation result of the calculation example 5 are as shown in Table 5, In the calculation example 5, when the diameter $\varphi_{pin}$ of the opening 172 of the light shielding element 17 is set to 2.10 mm (≈3.0σ), the shift width $\Delta y$ of the return light L5 in the collimator lens 3 is set to 1.80 mm, the distance Xu between the collimator lens 3 and the laser light source 2 is set to 4.0 mm, and the error $\Delta\psi$ of an installation angle of a half-wavelength plate is reduced to 0.2 deg, a calculation result of $P_r/P_0$ is less than $1\times10^{-6}$, as shown in Table 5. That is, it is ensured that the light intensity of the return light L5 that is incident on the laser light source 2 can be reduced by making the shift width $\Delta y$ satisfy a relationship of the Formula (A). Therefore, in the calculation example 5, the return light L5 can be prevented from being incident on the laser light source 2 to such an extent that a laser oscillation does not become unstable.

1.4.4. Calculation Examples 6 to 9

Calculation examples 6 to 9 will be described as examples when the light intensity $P_r$ calculated according to the above Formula (19) satisfies the Formula (17). Parameters and calculation results of the calculation examples 6 to 9 are as shown in Table 6.

TABLE 5

| | Calculation Example 5 | Value | Unit |
|---|---|---|---|
| Parameters | Diameter $\varphi_{pin}$ of Opening 172 of Light shielding element 17 | 2.10 | mm |
| | Shift Width $\Delta y$ of Return Light L5 in Colimator Lens 3 | 1.80 | mm |
| | Shift Angle $\theta'$ | 1.208 | deg |
| | Diffusion Radistion Angle & of Emitted Light L1 | 20 | deg |
| | Wavelength $\lambda$ of Emitted Light L1 | 850 | nm |
| | Light Diameter $R_{LD}$ of Laser Light Source 2 | 2.435 | μm |
| | Distance $x_{LD}$ between Collimator Lens 3 and Laser Light Source 2 | 4.0 | mm |
| | Light Diameter R of Emitted Light L1 Passing Through Collimator Lens 3 | 1.40 | mm |
| | Effective Diameter & of Collimator Lens 3 | 10 | mm |
| | Distance L Between Collimator Lens 3 and Optical Modulator 12 | 80.0 | mm |
| | Light Reflectance $Refl_M$ of Optical Modulator 12 | 30 | % |
| | Light Reflectance $Refl_S$ of Object to be Measured 14 | 80 | % |
| | Distance $L_{pin}$ between Collimator Lens 3 and Light shielding element 17 | 8.0 | mm |
| | Light Diameter $R_{pin}$ of Return Light L5 in Light shielding element 17 | 2.16 | mm |
| | Error $\Delta\psi$ o Installation Angle of Half-Wavelength Plate Formed by Two Quarter-Wavelength Plates 6 and 8 | 0.2 | deg |
| Calculation | $\kappa 2 + \frac{1}{2}(R + 2LR \cdot \lambda)$ | 1.25 | mm |
| Result | Ratio $P_r/P_0$ of Light Intensity $P_r$ of Return Light L5 not Shielded by Light shielding element 17 to Light Intensity $P_0$ of Emitted Light L1 | $9.61\times10^{-7}$ | — |

TABLE 6

| | | Unit | Calculation Example 5 | Calculation Example 6 | Calculation Example 7 | Calculation Example 8 | Calculation Example 9 |
|---|---|---|---|---|---|---|---|
| Parameter | Diameter $\varphi_{pin}$ | mm | 2.10 | 2.10 | 1.60 | 1.90 | 6.00 |
| | Shift Width Δy | mm | 1.80 | 2.30 | 1.40 | 2.10 | 2.00 |
| | Shift Angle θ' | deg | 1.290 | 1.647 | 6.685 | 10.03 | 1.433 |
| | Diffusion Radiation Angle θ | deg | 20 | 20 | 20 | 20 | 20 |
| | Wavelength λ | nm | 850 | 850 | 850 | 850 | 850 |
| | Light Diameter $R_{LD}$ | μm | 2.435 | 2.435 | 2.435 | 2.435 | 2.435 |
| | Distance $x_{LD}$ | mm | 4.0 | 4.0 | 3.0 | 3.0 | 40 |
| | Light Diameter R | mm | 1.40 | 1.40 | 1.05 | 1.05 | 13.96 |
| | Effective Diameter κ | mm | 1.0 | 1.0 | 1.0 | 1.0 | 1.0 |
| | Distance L | mm | 80.0 | 80.0 | 12.0 | 12.0 | 80.0 |
| | Light Reflectance $Refl_M$ | % | 30 | 30 | 30 | 30 | 30 |
| | Light Reflectance $Refl_S$ | % | 80 | 80 | 80 | 80 | 80 |
| | Distance $L_{pin}$ | mm | 8.0 | 8.0 | 1.0 | 1.0 | 10.0 |
| | Light Diameter $R_{pin}$ | mm | 2.16 | 2.16 | 1.61 | 1.91 | 6.02 |
| | Error Δψ | deg | 0.2 | 1.0 | 0.2 | 10 | 0.2 |
| Calculation Result | κ/2 + ½(R + 2L/R · λ) | mm | 1.25 | 1.25 | 1.03 | 1.03 | 1.20 |
| | Ratio $P_r/P_0$ | — | $9.61 \times 10^{-7}$ | $6.01 \times 10^{-7}$ | $3.96 \times 10^{-7}$ | $4.89 \times 10^{-7}$ | $8.41 \times 10^{-7}$ |

In the calculation example 6, when the diameter out of the opening 172 of the light shielding element 17 is set to 2.10 mm, the shift width Δy of the return light L5 in the collimator lens 3 is set to 2.30 mm, the distance $x_{LD}$ between the collimator lens 3 and the laser light source 2 is set to 4.0 mm, and the error Δψ of the installation angle of the half-wavelength plate is reduced to 1.0 deg, a calculation result of $P_r/P_0$ is less than $1\times10^{-6}$, as shown in Table 6.

In the calculation example 7, when the diameter Quim of the opening 172 of the light shielding element 17 is set to 1.60 mm, the shift width Δy of the return light L5 in the collimator lens 3 is set to 1.40 mm, the distance $x_{LD}$ between the collimator lens 3 and the laser light source 2 is set to 3.0 mm, and the error Δψ of an installation angle of the half-wavelength plate is reduced to 0.2 deg, a calculation result of $P_r/P_0$ is less than $1\times10^{-5}$, as shown in Table 6.

In the calculation example 8, when the diameter $\varphi_{pin}$ of the opening 172 of the light shielding element 17 is set to 1.90 mm, the shift width Δy of the return light L5 in the collimator lens 3 is set to 2.10 mm, the distance $x_{LD}$ between the collimator lens 3 and the laser light source 2 is set to 3.0 mm, and the error Δψ of the installation angle of the half-wavelength plate is reduced to 1.0 deg, a calculation result of $P_r/P_0$ is less than $1\times10^{-4}$, as shown in Table 6.

In the calculation example 9, when the diameter $\varphi_{pin}$ of the opening 172 of the light shielding element 17 is set to 6.00 mm, the shift width Δy of the return light L5 in the collimator lens 3 is set to 2.00 mm, the distance xx between the collimator lens 3 and the laser light source 2 is set to 40 mm, and the error Δψ of an installation angle of the half-wavelength plate is reduced to 0.2 deg, the calculation result of $P_r/P_0$ is less than $1\times10^{-4}$, as shown in Table 6.

Therefore, in the calculation examples 5 to 9, it is ensured that the return light L5 can be prevented from being incident on the laser light source 2 to such an extent that a laser oscillation does not become unstable by making the shift width Δy satisfy the relationship of the above Formula (A).

1.5. Influence of optical Axis Shift on Differential Amplification Processing

Next, an influence of an optical axis shift on a differential amplification processing will be described.

Figure 18:
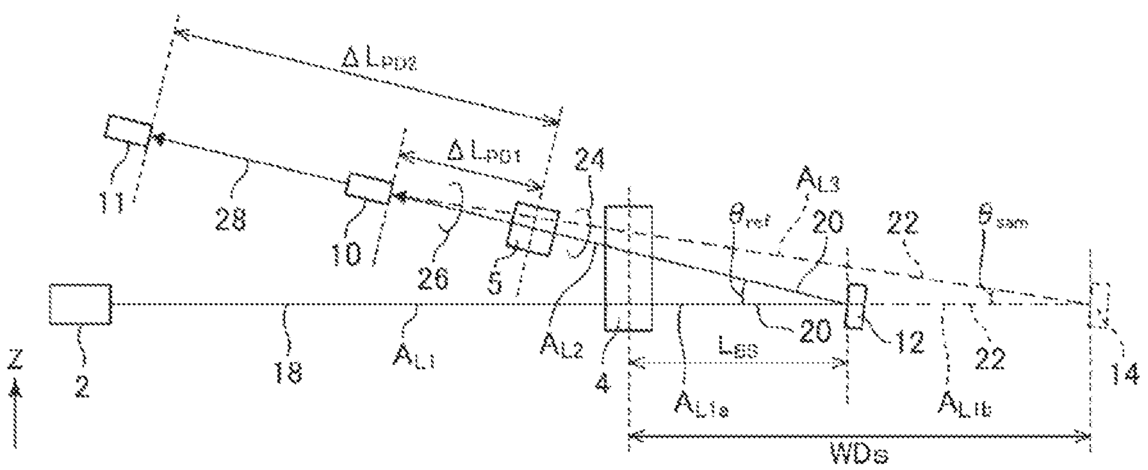
FIG. 18 is a schematic diagram showing an influence of an optical axis shift on a differential amplification processing.
Figure 19:
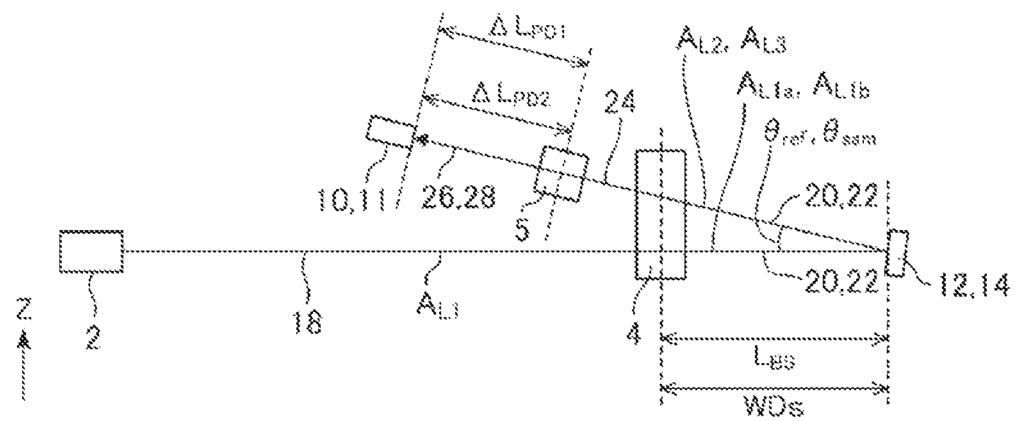
FIG. 19 is a schematic diagram showing an influence of an optical axis shift on a differential amplification processing.
Figure 20:
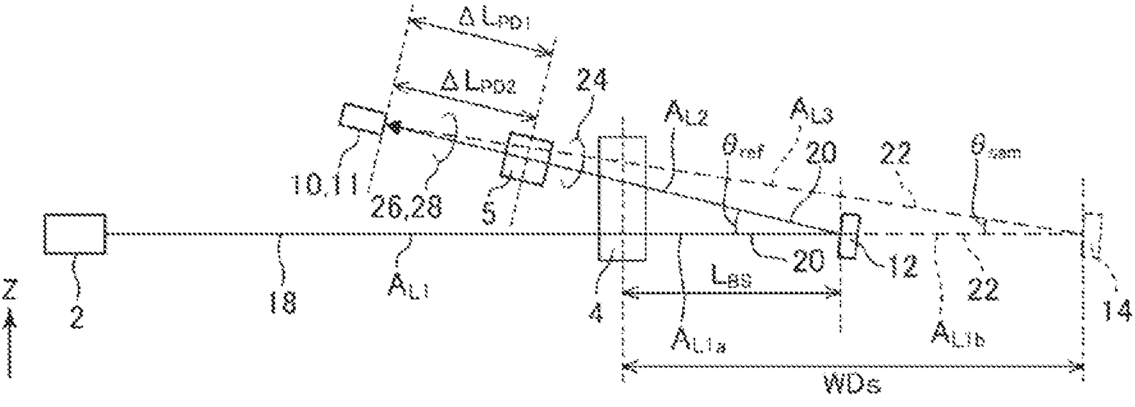
FIG. 20 is a schematic diagram showing an influence of an optical axis shift on a differential amplification processing.

FIGS. 17 to 20 are schematic diagrams showing an influence of the optical axis shift on the differential amplification processing. FIGS. 17 and 18 are diagrams showing a configuration of a comparative example, and FIGS. 19 and 20 are diagrams showing a configuration of the present embodiment. In FIGS. 17 to 20, optical paths refracted by the first light splitter 4 and the second light splitter 5 are shown in an extended manner for the convenience of illustration.

FIGS. 17 to 20 schematically show the optical path 18 between the laser light source 2 and the first light splitter 4, the optical path 20 between the first light splitter 4 and the optical modulator 12, the optical path 22 between the first light splitter 4 and the object to be measured 14, the optical path 24 between the first light splitter 4 and the second light splitter 5, the optical path 26 between the second light splitter 5 and the first light receiving element 10, and the optical path 28 between the second light splitter 5 and the second light receiving element 11.

In the drawings, a distance between the first light splitter 4 and the optical modulator 12 is denoted by $L_{BS}$, and a distance between the first light splitter 4 and the object to be measured 14 is denoted by WDs. Further, in the drawings, a distance between the second light splitter 5 and the first light receiving element 10 is denoted by $\Delta L_{PD1}$, and a distance between the second light splitter 5 and the second light receiving element 11 is denoted by $\Delta L_{PD2}$.

First, FIGS. 17 and 18 that show comparative examples will be described. In FIGS. 17 and 18, the distance $\Delta L_{PD1}$ and the distance $\Delta L_{PD2}$ are different from each other. In this case, depending on a relationship between the distance $L_{BS}$ and the distance WDs, interference light (the reference light L2 and the object light L3) may not be incident on both the first light receiving element 10 and the second light receiving element 11.

Specifically, FIG. 17 shows a special case where the distance $L_{BS}$ and the distance WDs are equal to each other.

An angle formed by the optical axis $A_{L1a}$ of the first split light Lia that travels from the first light splitter 4 toward the optical modulator 12 and the optical axis $A_{L2}$ of the reference light L2 that travels from the optical modulator 12 toward the first light splitter 4 is referred to as a "shift angle $\theta_{ref}$". On the other hand, an angle formed by an optical axis $A_{L1b}$ of the second split light L1*b* that travels from the first light splitter 4 toward the object to be measured 14 and an optical axis $A_{L3}$ of the object light 13 that travels from the object to be measured 14 toward the first light splitter 4 is referred to as a "shift angle $\theta_{sam}$".

In a special case where the distance $L_{BS}$ and the distance WDs are equal to each other, the shift angle $\theta_{ref}$ and the shift angle $\theta_{sam}$ are equal to each other as shown in FIG. 17. In this case, both the reference light L2 and the object light L3 can be incident on both the first light receiving element 10 and the second light receiving element 11.

However, the special case described above cannot be achieved since the distance WDs is fixed. When a displacement or a speed of the object to be measured 14 is measured, it is practical to adjust the distance WDS according to a measurement scene. Therefore, next, a case where the distance Les and the distance WDs are different from each other will be discussed.

FIG. 18 shows a case where the distance Las and the distance WDs are different from each other. When the distance $L_{BS}$ and the distance WDs are different from each other, the shift angle $\theta_{ref}$ and the shift angle $\theta_{sam}$ are also different from each other. In this case, both the reference light L2 and the object light L3 cannot be incident on both the first light receiving element 10 and the second light receiving element 11. A reason can be described as follows. As shown in FIG. 18, in a case where the distance $\Delta L_{PD1}$ and the distance $\Delta L_{PD2}$ are different from each other, three points of an emission point of the object light L3, the first light receiving element 10, and the second light receiving element 11 cannot be arranged on the same straight line even when three points of an emission point of the reference light L2, the first light receiving element 10, and the second light receiving element 11 are adjusted so as to be positioned on the same straight line. Therefore, light cannot travel in a manner of passing through these three points.

Next, FIGS. 19 and 20 that show the present embodiment will be described. In FIGS. 19 and 20, the distance $\Delta L_{PD1}$ and the distance $\Delta L_{PD2}$ are equal to each other. In this case, the interference light (the reference light L2 and the object light L3) can be incident on both the first light receiving element 10 and the second light receiving element 11 regardless of the relationship between the distance $L_{BS}$ and the distance WDs.

Specifically, FIG. 19 shows a special case where the distance $L_{BS}$ and the distance WDs are equal to each other. In this case, the shift angle $\theta_{ref}$ and the shift angle $\theta_{sam}$ are equal to each other as shown in FIG. 19. Therefore, both the reference light L2 and the object light L3 can be incident on both the first light receiving element 10 and the second light receiving element 11.

FIG. 20 shows a case where the distance Las and the distance WDs are different from each other. When the distance $L_{BS}$ and the distance WDs are different from each other, the shift angle $\theta_{ref}$ and the shift angle $\theta_{sam}$ are also different from each other. However, since the distance $\Delta L_{PD1}$ and the distance $\Delta L_{PD2}$ are equal to each other, both the reference light L2 and the object light L3 can be incident on both the first light receiving element 10 and the second light receiving element 11. A reason can be described as follows. As shown in FIG. 20, in a case where the distance $\Delta L_{PD1}$ and the distance $\Delta L_{PD2}$ are equal to each other, when three points of the emission point of the reference light L2, the first light receiving element 10, and the second light receiving element 11 are adjusted to be positioned on the same straight line, three points of the emission point of the object light L3, the first light receiving element 10, and the second light receiving element 11 can be arranged on another same straight line. Therefore, light can travel in a manner of passing through these three points.

As described above, the distance $\Delta L_{PD1}$ and the distance $\Delta L_{PD2}$ are set to be equal to each other in the present embodiment. Accordingly, even when the distance $L_{BS}$ and the distance WDs are different from each other, both the reference light L2 and the object light L3 can be incident on both the first light receiving element 10 and the second light receiving element 11. As a result, it is possible to implement the optical system 50 capable of performing a differential amplification processing while adopting an optical axis shift.

Theoretically, it is required that the distance $\Delta L_{PD1}$ and the distance $\Delta L_{PD2}$ are equal to each other, but a deviation between the distance $\Delta L_{PD1}$ and the distance $\Delta L_{PD2}$ can be allowed to some extent depending on the distance WDs, the size of the optical system 50, and the like. Specifically, when a difference between the distance $\Delta L_{PD1}$ and the distance $\Delta L_{PD2}$ is $\Delta L_{dif}$, the difference $\Delta L_{dif}$ satisfies the following Formula (C).

$$\Delta L_{dif} \leq 20\text{ mm} \tag{C}$$

When the difference $\Delta L_{dif}$ falls within this range, it is possible to implement the optical system 50 capable of performing a differential amplification processing while adopting an optical axis shift.

Hereinafter, a process of deriving the above Formula (C) will be described.

Figure 21:
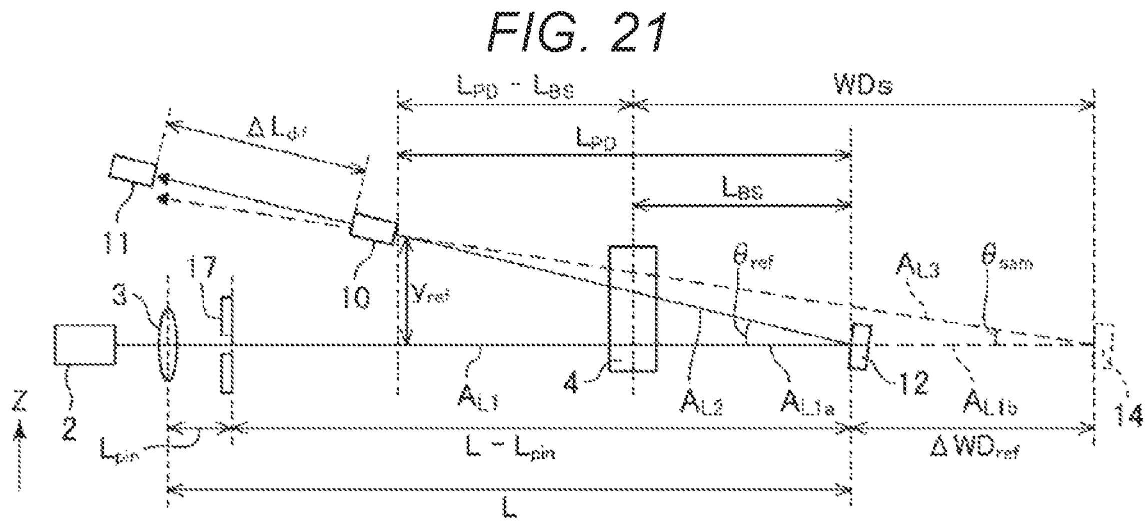
FIG. 21 is a diagram adding a change to the schematic diagram in FIG. 20 which shows the influence of the optical axis shift on the differential amplification processing so as to provide a distance difference $\Delta L_{dif}$ between a first light receiving element and a second light receiving element.
Figure 22:
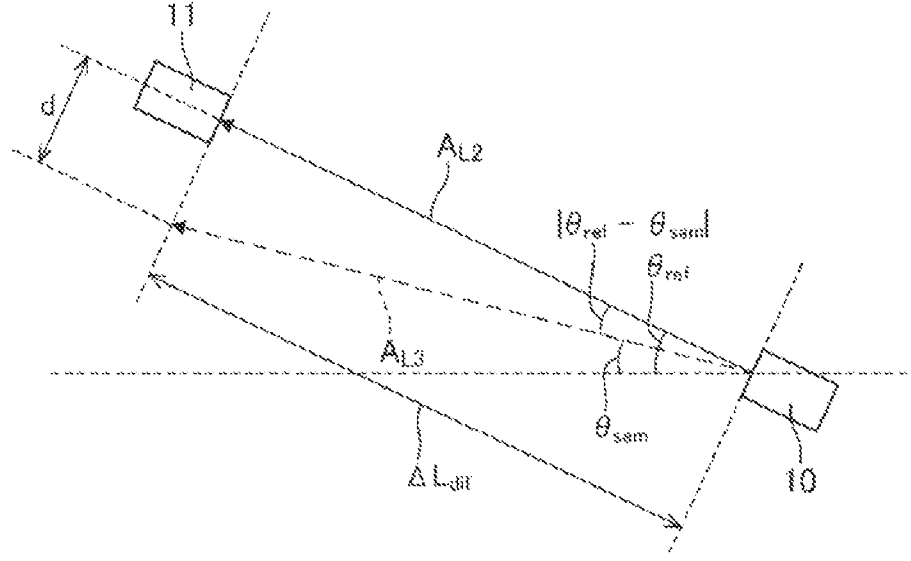
FIG. 22 is a partially enlarged view of FIG. 21.

FIG. 21 is a diagram adding a change to the schematic diagram in FIG. 20 which shows an influence of the optical axis shift on the differential amplification processing so as to provide a distance difference $\Delta L_{dif}$ between the first light receiving element 10 and the second light receiving element 11. FIG. 22 is a partially enlarged view of FIG. 21.

In FIG. 21, the first light receiving element 10 and the second light receiving element 11 are arranged so as to be aligned with the optical axis $A_{L2}$ of the reference light L2. In this case, since there is the distance difference $\Delta L_{dif}$ between the first light receiving element 10 and the second light receiving element 11, for example, when the optical axis Awa of the object light L3 is aligned with the first light receiving element 10, theoretically, the optical axis Aza cannot be aligned with the second light receiving element 11.

An angle formed by the optical axis $\Delta_{L2}$ and the optical axis $A_{L3}$ is expressed by $|\theta_{ref}-\theta_{sam}|$ as shown in FIG. 22. In this case, a shift width d between the optical axis Aws and the optical axis $A_{L3}$ at a position of the second light receiving element 11 is expressed by the following Formula (22).

$$d = \Delta L_{dif}\tan(|\theta_{ref} - \theta_{sam}|) \tag{22}$$

Here, a light diameter of the reference light L2 at the position of the second light receiving element 11 is denoted by $R_{gom}$, and a light diameter of the object light L3 at the position of the second light receiving element 11 is denoted by $R_{sam}$.

In FIG. 21, a light diameter of the emitted light L1 is reduced by the light shielding element 17. Therefore, the $R_{qom}$ of the reference light L2 is calculated based on the above Formula (16-3), and is expressed as the following Formula (23).

$$R_{qom} = \phi_{pin} + \frac{L - L_{pin} + L_{PD}\sqrt{(1+\tan\theta_{ref}^2)} + \Delta L_{dif}}{\phi_{pin}}\lambda \tag{23}$$

On the other hand, the light diameter $R_{sam}$ of the object light 13 is calculated based on the above Formula (16-3), and is expressed as the following Formula (24).

$$R_{sam} = \phi_{pin} + \frac{L - L_{pin} + \Delta WD_{ref} + (\Delta WD_{ref} + L_{PD})\sqrt{(1+\tan\theta_{sam}^2)} + \Delta L_{dif}}{\phi_{pin}}\lambda \tag{24}$$

Here, for example, $L=L_{PD}$. In this case, a shift width $y_{ref}$ of the optical axis $A_{L2}$ of the reference light L2 at a position of the first light receiving element 10 shown in FIG. 21 is equal to a shift width $\Delta y$ of the optical axis $A_{L5}$ at a position of the collimator lens 3 shown in FIG. 16. Therefore, $\theta_{ref}$ in the above Formula (23) is calculated according to $\tan\theta_{ref}=\Delta y/L_{PD}\approx\theta_{ref}$. $\theta_{sam}$ in the above Formula (24) is calculated according to $\tan\theta_{sam}==\Delta y/(L_{PD}+\Delta WD_{ref})\approx\theta_{sam}$.

Parameters used in the above Formula (23) and the above Formula (24) can take, for example, the following values.

Wavelength $\lambda$=400 nm to 1600 mm

Distance L between the collimator lens 3 and the optical modulator 12=90 mm

Distance $L_{pin}$ between the collimator lens 3 and the light shielding element 17=8 mm Shift width $\Delta y$ of the optical axis $A_{L5}$ at the position of the collimator lens 3=1.6 mm Diameter $\varphi_{pin}$ of the opening 172 of the light shielding element 17=1.50 mm Distance $L_{PD}$ between the optical modulator 12 and the first light receiving element 10=90 mm Difference $\Delta WD_{ref}$ between the distance $L_{BS}$ and the distance WDs=30 mm to 60 mm The light diameter $R_{qon}$ of the reference light La at the position of the second light receiving element 11 and the light diameter $R_{sam}$ of the object light L3 at the position of the second light receiving element 11 are calculated according to the above Formulas (23) and (24).

Figure 23:
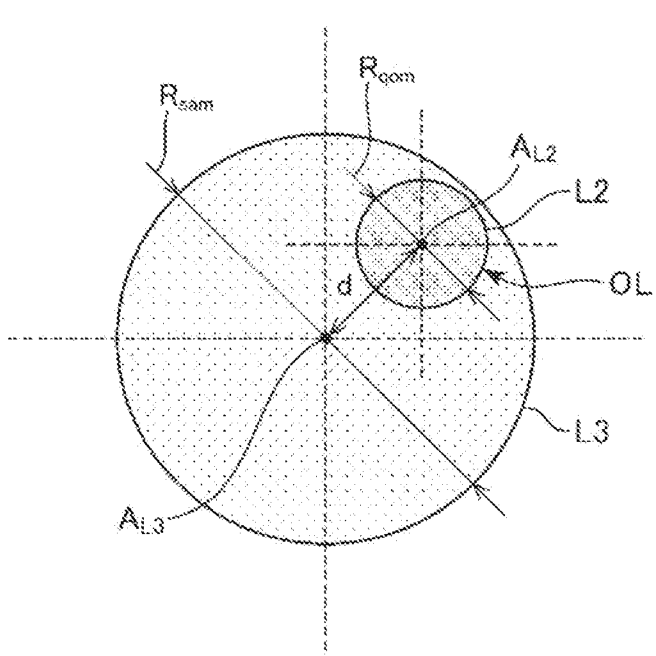
FIG. 23 is a diagram schematically showing light diameters of reference light and object light that reached a position of the second light receiving element shown in FIG. 22.

FIG. 23 is a diagram schematically showing light diameters of the reference light L2 and the object light L3 that reached the position of the second light receiving element 11 shown in FIG. 22.

When the shift width d between the optical axis $A_{L2}$ and the optical axis $A_{L3}$ at the position of the second light receiving element 11 is equal to or less than a predetermined value, the object light L3 and the reference light L2 overlap with each other as shown in FIG. 23. The interference light received by the first light receiving element 10 and the second light receiving element 11 corresponds to an overlapping portion OL of the object light 13 and the reference light L2 shown in FIG. 23. Therefore, in order to output light reception signals having a high S/N ratio from the first light receiving element 10 and the second light receiving element 11, it is required to consider how the object light L3 and the reference light L2 overlap each other.

Light amount distributions of the reference light L2 and the object light L3 can be regarded as a Gaussian distribution. When the shift width d increases, a light amount is attenuated even in the overlapping portion OL. In consideration of an allowable S/N ratio, it is required to reduce the attenuation of the light amount in the overlapping portion OL to, for example, 1% or less. In this case, the allowable shift width d calculated using the above parameters is, for example, 0.12 mm or less. Therefore, an allowable value of the difference $\Delta L_{dif}$ that is a difference between the distance $\Delta L_{PD1}$ and the distance $\Delta L_{PD2}$ and that satisfies the allowable shift width d is calculated.

First, the above Formula (22) is transformed into the following Formula (25).

$$d = \frac{|\tan\theta_{ref} - \tan\theta_{sam}|}{1+\tan\theta_{ref}\tan\theta_{sam}}\Delta L_{dif} = \frac{\left|\frac{y_{ref}}{L_{PD}} - \frac{y_{ref}}{L_{PD}+\Delta WD_{ref}}\right|}{1+\frac{y_{ref}^2}{L_{PD}(L_{PD}+\Delta WD_{ref})}}\Delta L_{dif} = \frac{\Delta WD_{ref}\, y_{ref}}{L_{PD}(L_{PD}+\Delta WD_{ref})y_{ref}^2}\Delta_{dif} \tag{25}$$

Here, as described above, when $L=L_{PD}$ and $y_{ref}=\Delta y$, the above Formula (25) can be transformed as shown in the following Formula (26).

$$d = \frac{\Delta WD_{ref}\Delta y}{L_{PD}(L_{PD}+\Delta WD_{ref})+\Delta y^2}\Delta L_{ref} \tag{26}$$

The above Formula (C) is derived by inputting the above parameters to the above Formula (26).

1.5.1. Calculation Example 10

A calculation example 10 will be described as an example of a case where the Formula (C) is satisfied. Parameters and a calculation result of the calculation example 10 are as shown in Table 7. In this calculation example, in order to obtain an effect that the return light L5 is prevented from being incident on the laser light source 2 to such an extent that a laser oscillation does not become unstable and an attenuation of a light amount in the overlapping portion OL is reduced by the optical axis shift described above, an example of a value allowed for the difference $\Delta L_{dif}$ between the distance $\Delta L_{PD1}$ and the distance $\Delta L_{PD2}$ is calculated using the following parameters.

TABLE 7

| Calculation Example 10 | | Value | Unit |
|---|---|---|---|
| Parameters | Diameter $\varphi_{pin}$ of Opening 172 of Light shielding element 17 | 1.50 | mm |
| | Difference $\Delta WD_{ref}$ between Distance $L_{BS}$ and Distance WDs (=WDs − $L_{BS}$) | ≤1000 | mm |
| | Optical System Diameter $\varphi_{50}$ | ≥3 | cm |
| | Optical System Volume $V_{50}$ | ≥10 | cc |
| | Wavelength $\lambda$ of Emitted Light L1 | 400 to 1600 | nm |
| Calculation Result | Allowable Value of Difference $\Delta L_{dif}$ between Distance $\Delta L_{PD1}$ and Distance $\Delta L_{PD2}$ | ≤20 | mm |

In the calculation example 10, the diameter $\varphi_{pin}$ of the opening 172 of the light shielding element 17 is set to 1.50 mm as shown in Table 7. In this case, when the difference $\Delta WD_{ref}$ is 1000 mm or less, an allowable value of the difference $\Delta L_{dif}$ can be set to 20 mm or less in a realistic range in which an optical system volume $V_{50}$ is 10 co or more and a wavelength λ of the emitted light L1 is 400 mm to 1600 mm. That is, when the allowable value of the difference $\Delta L_{dif}$ is set to 20 mm or less, it is ensured that the shift width d can be reduced to a predetermined value or less and a differential amplification processing can be performed while preventing the return light L5 by the optical axis shift in this calculation example.

In a case where the diameter $\varphi_{pin}$ is set to 1.50 mm, even when the light shielding element 17 is not provided, the return light L5 that is incident on the laser light source 2 is shielded to the same extent as in a case where the light shielding element 17 is provided. Therefore, the calculation example 10 can be regarded as a calculation example in a case where the light shielding element 17 is not provided.

The optical system diameter $\varphi_{50}$ affects the optical system volume $V_{50}$ and an overall size of the laser interferometer 1. In consideration of both handleability and manufacturability of the laser interferometer 1, the optical system diameter $\varphi_{50}$ is preferably 15 mm or more and 200 mm or less, and more preferably 20 mm or more and 150 mm or less. The optical system diameter $\varphi_{50}$ refers to a diameter of a perfect circle inscribed by the optical system 50 when the optical system 50 is viewed from the z axis.

1.5.2. Calculation Examples 11 to 16

The calculation examples 11 to 16 will be described as an example of a case where the Formula (C) is satisfied. Parameters and calculation results of the calculation examples 11 to 16 are as shown in Table 8. In these calculation examples, in order to obtain an effect of preventing the return light L5 from being incident on the laser light source 2 to such an extent that a laser oscillation does not become unstable and an attenuation of a light amount in the overlapping portion OL is reduced by the optical axis shift described above, an example of a value allowed for the difference $\Delta L_{dif}$ between the distance $\Delta L_{PD1}$ and the distance $\Delta L_{PD2}$ is calculated using the following parameters.

As described above, the laser interferometer 1 according to the present embodiment includes the laser light source 2, the first light splitter 4, the optical modulator 12, the second light splitter 5, the first light receiving element 10, and the second light receiving element 11. The laser light source 2 emits the emitted light L1 (laser light). The first light splitter 4 splits the emitted light L1 into the first split light L1*a* and the second split light L1*b*. The optical modulator 12 modulates the first split light L1*a* into the reference light L2 having a different frequency. The second light splitter 5 splits interference light between the reference light L2 and the object light L3 that is generated by the object to be measured 14 reflecting the second split light L1*b* into the third split light L6*a* and the fourth split light L6*b*. The first light receiving element 10 receives the third split light L6*a*, and the second light receiving element 11 is disposed at a position different from a position of the first light receiving element 10 and receives the fourth split light L6*b*.

In the laser interferometer 1 according to the present embodiment, the optical axis $A_{L1a}$ of the first split light L1*a* that travels from the first light splitter 4 toward the optical modulator 12 and the optical axis $A_{L2}$ of the reference light L2 that travels from the optical modulator 12 toward the first light splitter 4 are shifted from each other. The difference $\Delta L_{dif}$ between the distance $\Delta L_{PD1}$ (an optical path length) from the second light splitter 5 to the first light receiving element 10 and the distance $\Delta L_{PD2}$ (an optical path length) from the second light splitter 5 to the second light receiving element 11 is 20 mm or less.

According to such a configuration, a differential amplification processing using the first light receiving element 10 and the second light receiving element 11 can be performed. The return light L5 can be prevented from being incident on the laser light source 2 by an optical axis shift. Since the difference $\Delta L_{dif}$ is reduced to be within a predetermined range, it is possible to prevent an adverse effect of the optical shift on the differential Exis amplification processing. As a result, an S/N ratio of a light reception signal can be effectively increased, and accuracy of demodulating a sample signal that is derived from the object to be measured 14 from the light reception signal can be increased.

TABLE 8

| | | Unit | Calculation Example 11 | Calculation Example 12 | Calculation Example 13 | Calculation Example 14 | Calculation Example 15 | Calculation Example 16 |
|---|---|---|---|---|---|---|---|---|
| Parameters | Diameter $\varphi_{pin}$ | mm | 1.50 | 1.50 | 0.50 | 1.00 | 0.50 | 1.50 |
| | Difference $\Delta WD_{ref}$ | mm | ≤40 | ≤1000 | ≤1000 | ≤1000 | ≤1000 | ≤10 |
| | Optical System Diameter $\varphi_{50}$ | cm | ≥10 | ≥3 | ≥3 | ≥10 | ≥10 | ≥10 |
| | Optical System Volume $V_{50}$ | cc | ≥100 | ≥10 | ≥10 | ≥100 | ≥100 | ≥100 |
| | Wavelength λ | nm | 400 to 1600 | 400 to 1600 | 400 to 1600 | 400 to 1600 | 400 to 1600 | 400 to 1600 |
| Calculation results | Allowable Value of Difference $\Delta L_{dif}$ | mm | ≤20 | ≤1 | ≤3 | ≤5 | ≤8 | ≤10 |

In these calculation examples, it is ensured that a differential amplification processing can be performed while preventing the return light L5 by the optical axis shift when the difference $\Delta L_{dif}$ is set to 20 mm or less, as shown in Table 8.

When the difference $\Delta L_{dif}$ exceeds an upper limit value, a shift width between the reference light L2 and the object light L3 is increased, and it is less likely to perform the differential amplification processing.

It is preferable that the difference $\Delta L_{dif}$ between the distance $\Delta L_{PD1}$ (the optical path length) from the second light splitter 5 to the first light receiving element 10 and the distance $\Delta L_{PD2}$ (the optical path length) from the second light splitter 5 to the second light receiving element 11 is 10 mm or less. That is, the difference $\Delta L_{dif}$ preferably satisfies the following Formula (C-1).

$$\Delta L_{dif} \leqq 10 \text{ mm} \quad \text{(C-1)}$$

As a result, the difference $\Delta WD_{ref}$ between the distance $L_{BS}$ and the distance WDs can be extended as compared with a case where the difference $\Delta L_{dif}$ satisfies the Formula (C). The difference $\Delta WD_{ref}$ is a parameter that determines a working distance of the laser interferometer 1. Therefore, when the difference $\Delta L_{dif}$ satisfies the above Formula (C), handleability of the laser interferometer 1 is improved.

As described above, the laser interferometer 1 may include the light shielding element 17. The light shielding element 17 is disposed between the laser light source 2 and the first light splitter 4, and has the opening 172 through which the emitted light L1 (laser light) passes.

According to such a configuration, the light shielding element 17 shields the return light L5 without preventing of the emitted light L1 from passing through. Therefore, the return light L5 can be particularly prevented from being incident on the laser light source 2 by using the light shielding element 17 while adopting the optical axis shift.

The diameter $\varphi_{pin}$ [mm] of the opening 172 of the light shielding element 17 preferably satisfies the above Formula (20), more preferably satisfies $0.10 \leq \varphi_{pin} \leq 6.00$, and still more preferably satisfies $0.30 \leq \varphi_{pin} \leq 3.00$.

It is particularly preferable that the diameter $\varphi_{pin}$ [mm] of the opening 172 of the light shielding element 17 satisfies $0.50 \leq \varphi_{pin} \leq 1.50$.

As a result, the light shielding element 17 has a sufficient shielding capability of shielding the return light L5 without preventing the emitted light L1 from passing through. As a result, an S/N ratio of light reception signals output from the first light receiving element 10 and the second light receiving element 11 can be particularly increased.

When the diameter $\varphi_{pin}$ falls below a lower limit value, depending on a light diameter of the emitted light L1, the light shielding element 17 may prevent the emitted light L1 from passing through, and an intensity of interference light that is incident on the first light receiving element 10 and the second light receiving element 11 may be reduced. On the other hand, when the diameter @pir exceeds an upper limit value, the return light L5 easily passes through the opening 172, and thus an amount of the return light L5 that is incident on the laser light source 2 may increase.

It is preferable that the difference $\Delta L_{dif}$ between the distance $\Delta L_{PD1}$ (the optical path length) from the second light splitter 5 to the first light receiving element 10 and the distance $\Delta L_{PD2}$ (the optical path length) from the second light splitter 5 to the second light receiving element 11 is 8 mm or less. That 18, the difference $\Delta L_{dif}$ preferably satisfies the following Formula (C-2).

$$\Delta L_{dif} \leqq 8 \text{ mm} \quad \text{(C-2)}$$

As a result, even when the relatively small light shielding element 17 of which the diameter outs of the opening 172 is 0.50 mm is used, the differential amplification processing can be performed. As a result, it is possible to achieve a high S/N ratio of a light reception signal by the differential amplification processing while particularly preventing the return light L5 by the optical axis shift.

Further, it is preferable that the difference $\Delta L_{dif}$ between the distance $\Delta L_{PD1}$ (the optical path length) from the second light splitter 5 to the first light receiving element 10 and the distance $\Delta L_{PD2}$ (the optical path length) from the second light splitter 5 to the second light receiving element 11 is 1 mm or less. That is, the difference $\Delta L_{dif}$ preferably satisfies the following Formula (C-3).

$$\Delta L_{dif} \leqq 1 \text{ mm} \quad \text{(C-3)}$$

Accordingly, the optical system volume $V_{50}$ can be reduced to about 10 co regardless of whether the light shielding element 17 is provided. As a result, it is possible to implement the laser interferometer 1 that is particularly reduced in size, 1.6. Arrangement of Optical Modulator and Light Receiving Element Next, an arrangement of the optical modulator 12, the first light receiving element 10, and the second light receiving element 11 will be described.

In the laser interferometer 1, a working distance may change in various manner according to a measurement scene. In this case, even when the distance WDs changes to any value, it is required to prevent the return light L5 from being incident on the laser light source 2 by the light shielding element 17. Since an arrangement of the first light receiving element 10 and the second light receiving element 11 is set in accordance with an arrangement of the optical modulator 12, a relationship between the arrangement of the optical modulator 12 and the arrangement of the first light receiving element 10 and the second light receiving element 11 will be described below.

Figure 24:
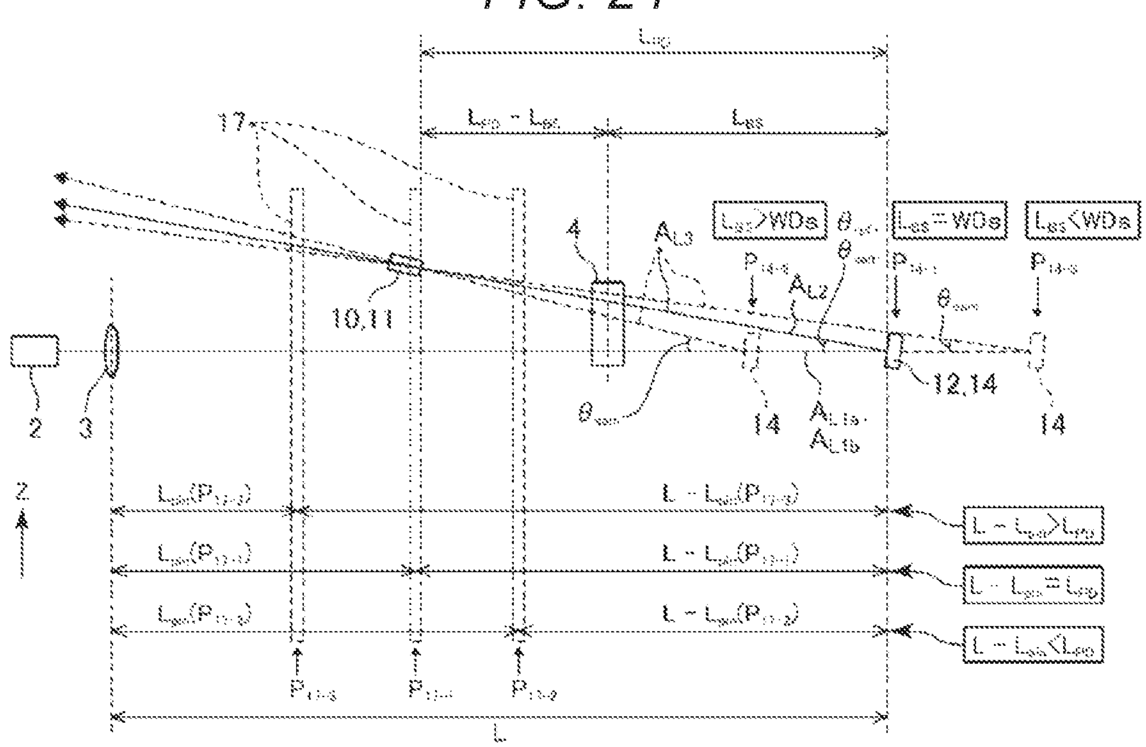
FIG. 24 is a diagram showing a change in an optical axis $A_{L3}$ of object light L3 when a distance WDs is different in three patterns relative to a distance $L_{BS}$.

FIG. 24 is a diagram showing a change in the optical axis $A_{L3}$ of the object light L3 when the distance WDs is different in three patterns relative to the distance $L_{BS}$. The distance $L_{BS}$ is a distance between the first light splitter 4 and the optical modulator 12, and the distance WDs is a distance between the first light splitter 4 and the object to be measured 14. FIG. 24 shows a case where the object to be measured 14 is positioned at positions $P_{14-1}$, $P_{14-2}$, and $P_{14-3}$. When the object to be measured 14 is positioned at the position $P_{14-1}$, $L_{BS}$=WDs. When the object to be measured 14 is positioned at $P_{14-2}$, $L_{BS}$>WDs. When the object to be measured 14 is positioned at $P_{14-3}$, $L_{BS}$<NDS.

In addition, FIG. 24 shows a positional relationship among the light shielding element 17, the first light receiving element 10, and the second light receiving element 11 when a distance $L-L_{pin}$ is different in three patterns relative to the distance $L_{PD}$. The distance $L_{PD}$ is a distance between the optical modulator 12 and the first light receiving element 10 and between the optical modulator 12 and the second light receiving element 11. FIG. 24 shows a case where the light shielding element 17 is positioned at positions $P_{17-1}$, $P_{17-2}$ and $P_{17-3}$.

The distance L is a distance between the collimator lens 3 and the optical modulator 12. The distance $L_{pin}$ is a distance between the collimator lens 3 and the light shielding element 17.

In the following description, magnitude relationship between the distance $L_{PD}$ and the distance $L-L_{pin}$ is divided into three patterns. In any case, an inclination of the optical modulator 12 is adjusted such that the reference light L2 is incident on the first light receiving element 10 and the second light receiving element 11.

$$L - L_{pin} = L_{PD}. \quad 1.6.1$$

The light shielding element 17 is provided for the purpose of shielding the return light L5 derived from the reference light L2. Therefore, the distance $L-L_{pin}$ that is a distance between the optical modulator 12 and the light shielding element 17 is set to a distance at which the return light L5 derived from the reference light L2 and the return light L5 derived from the object light L3 can be shielded. The diameter $\varphi_{pin}$ of the opening 172 of the light shielding element 17 is also set to a diameter at which the return light L5 can be shielded.

When $L_{BS}$=WDs, both the return light L5 derived from the reference light L2 and the return light L5 derived from the object light L3 are shielded by the light shielding element 17 positioned at the position $P_{17-1}$.

The inclination of the object to be measured 14 is adjusted such that the object light L3 is incident on the first light receiving element 10 and the second light receiving element 11. Therefore, the return light L5 derived from the object light L3 reaches an outer side of the opening 172 of the light shielding element 17 and is shielded.

Since $L-L_{pin}=L_{PD}$, an arrival position of the return light L5 derived from the object light L3 to the light shielding element 17 does not change regardless of a relationship between the distance WDs and the distance $L_{BS}$. That is, in both cases of $L_{BS}$>WDs and $L_{BS}$<WDs, the return light L5 derived from the object light L3 is shielded by the light shielding element 17. Therefore, when $L-L_{pin}=L_{PD}$, theoretically, the return light L5 does not pass through the light shielding element 17, $$L - L_{pin} < L_{PD}. \quad 1.6.2$$

When $L-L_{pin}<L_{PD}$, the light shielding element 17 positioned at the position $P_{17-2}$ is closer to the first light splitter 4 than that in the case of $L-L_{pin}=L_{PD}$. Then, the arrival position of the return light L5 derived from the object light L3 to the light shielding element 17 changes according to the relationship between the distance WDs and the distance $L_{BS}$.

When $L_{BS}$=WDs, the return light L5 derived from the object light L3 is shielded by the light shielding element 17 at the position $P_{17-2}$.

When $L_{BS}$<WDs, the arrival position of the return light L5 derived from the object light L3 is farther from the opening 172 of the light shielding element 17 than that in the case of $L_{BS}$=WDS. Therefore, the return light L5 derived from the object light L3 is shielded by the light shielding element 17.

When $L_{BS}$>WDs, the arrival position of the return light L5 derived from the object light L3 is closer to the opening 172 of the light shielding element 17 than that in the case of $L_{BS}$=WDS. Therefore, the return light L5 derived from the object light L3 may pass through the opening 172. However, even when the return light L5 derived from the object light L3 passes through the opening 172, the return light L5 that passed through the opening 172 travels in a direction away from the laser light source 2. Therefore, a probability that the return light L5 is incident on the laser light source 2 is fairly low.

$$\text{When } L - L_{pin} > L_{PD}. \quad 1.6.3$$

When $L-L_{pin}>L_pD$, the light shielding element 17 at the position $P_{17-3}$ is farther from the first light splitter 4 than that in the case of $L-L_{pin}=L_{PD}$. In this case, the arrival position of the return light L5 derived from the object light L3 to the light shielding element 17 changes according to the relationship between the distance WDs and the distance $L_{BS}$.

When $L_{BS}$=WDs, the return light L5 derived from the object light L3 is shielded by the light shielding element 17 at the position $P_{17-3}$.

When $L_{BS}$>WDs the arrival position of the return light L5 derived from the object light 13 is farther from the opening 172 of the light shielding element 17 than that in the case of $L_{BS}$=WDs. Therefore, the return light L5 derived from the object light L3 is shielded by the light shielding element 17.

When $L_{BS}$<WDS, the arrival position of the return light L5 derived from the object light 13 is closer to the opening 172 of the light shielding element 17 than that in the case of $L_{BS}$=WDs. Therefore, the return light L5 derived from the object light L3 may pass through the opening 172. When $L_{BS}$<WDs, since the shift angle $\theta_{san}$ is relatively small, the probability that the return light L5 derived from the object light L3 is incident on the laser light source 2 after the return light L5 passed through the opening 172 may be high. Therefore, it is preferable that a positional relationship among the light shielding element 17, the first light receiving element 10, and the second light receiving element 11 does not satisfy $L-L_{pin}>L_{PD}$. That is, the optical system 50 of the laser interferometer 1 preferably satisfies $L-L_{pin}\leq L_{PD}$.

As described above, the distance $L-L_{pin}$ (an optical path length) from the optical modulator 12 to the light shielding element 17 is preferably equal to or less than the distance $L_{PD}$ (an optical path length) from the optical modulator 12 to the first light receiving element 10.

According to such a configuration, it is possible to sufficiently reduce the probability that the return light L5 is incident on the laser light source 2 regardless of the distance WDs corresponding to a working distance. As a result, a laser oscillation can be prevented from becoming unstable, and an S/N ratio of a light reception signal can be prevented from being reduced.

2. Second to Fourth Modifications of Laser Interferometer

Next, laser interferometers according to second to fourth modifications will be described.

Figure 25:
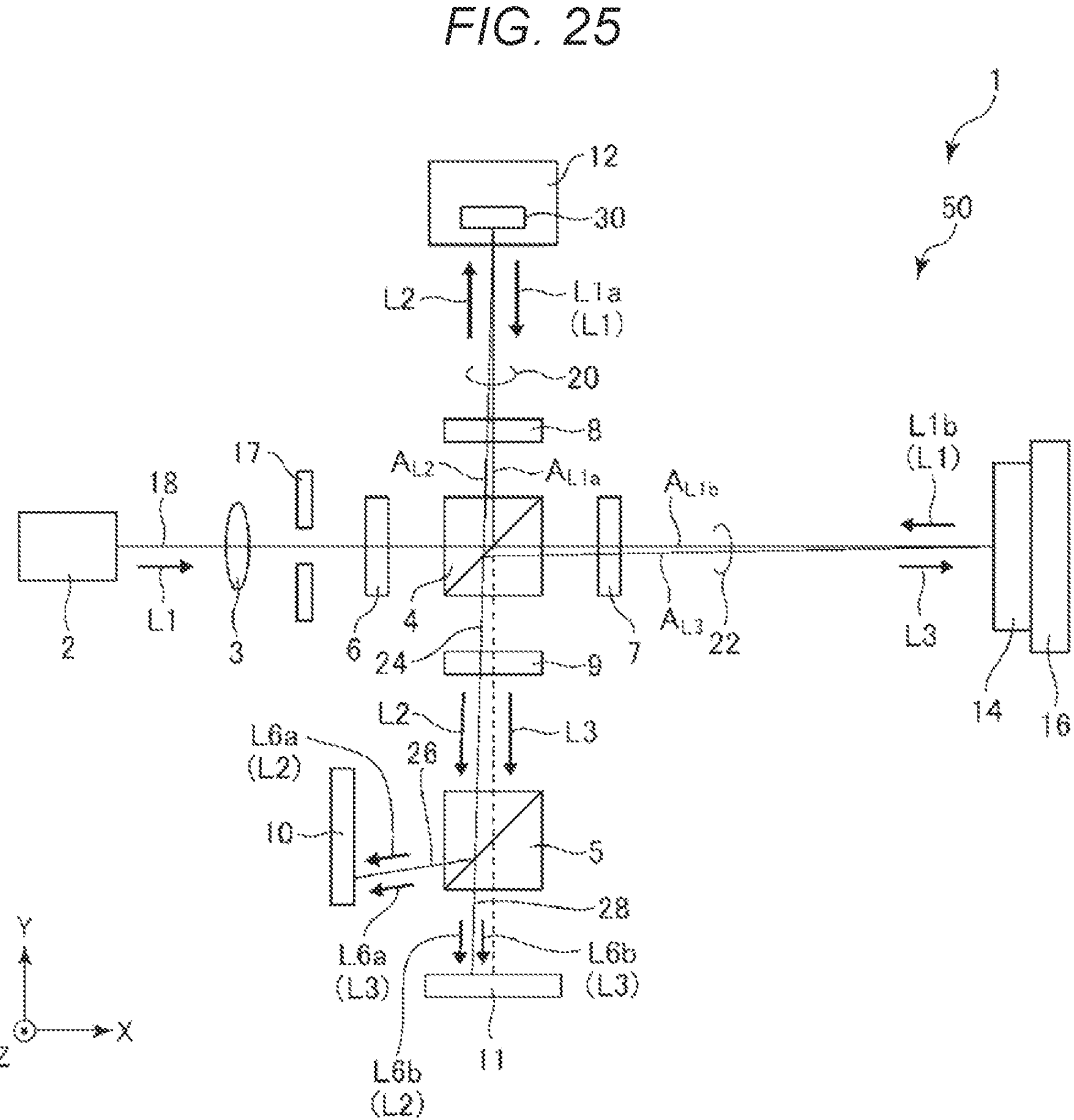
FIG. 25 is a schematic configuration diagram showing an optical system provided in the laser interferometer according to a second modification.
Figure 26:
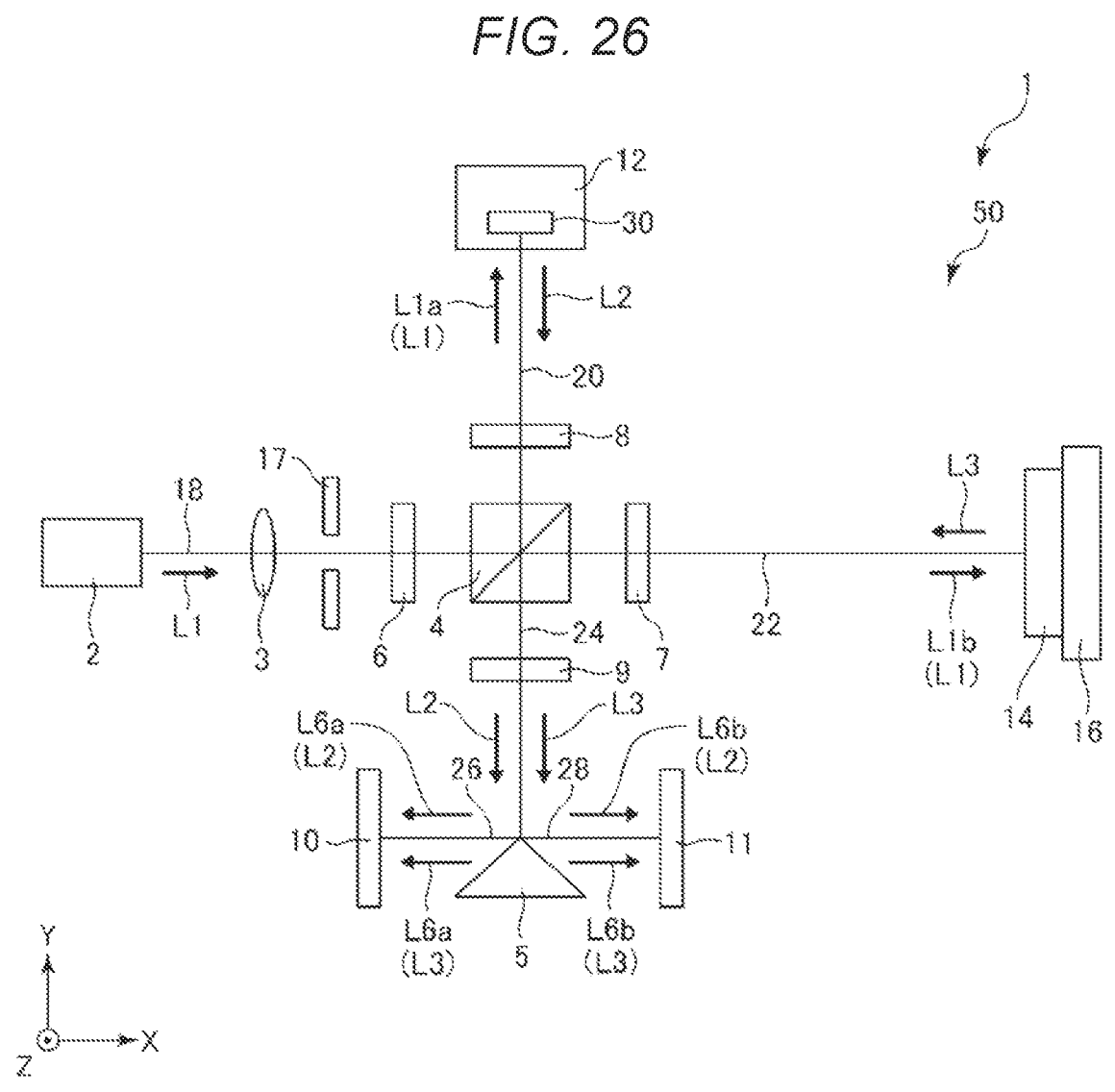
Figure 27:
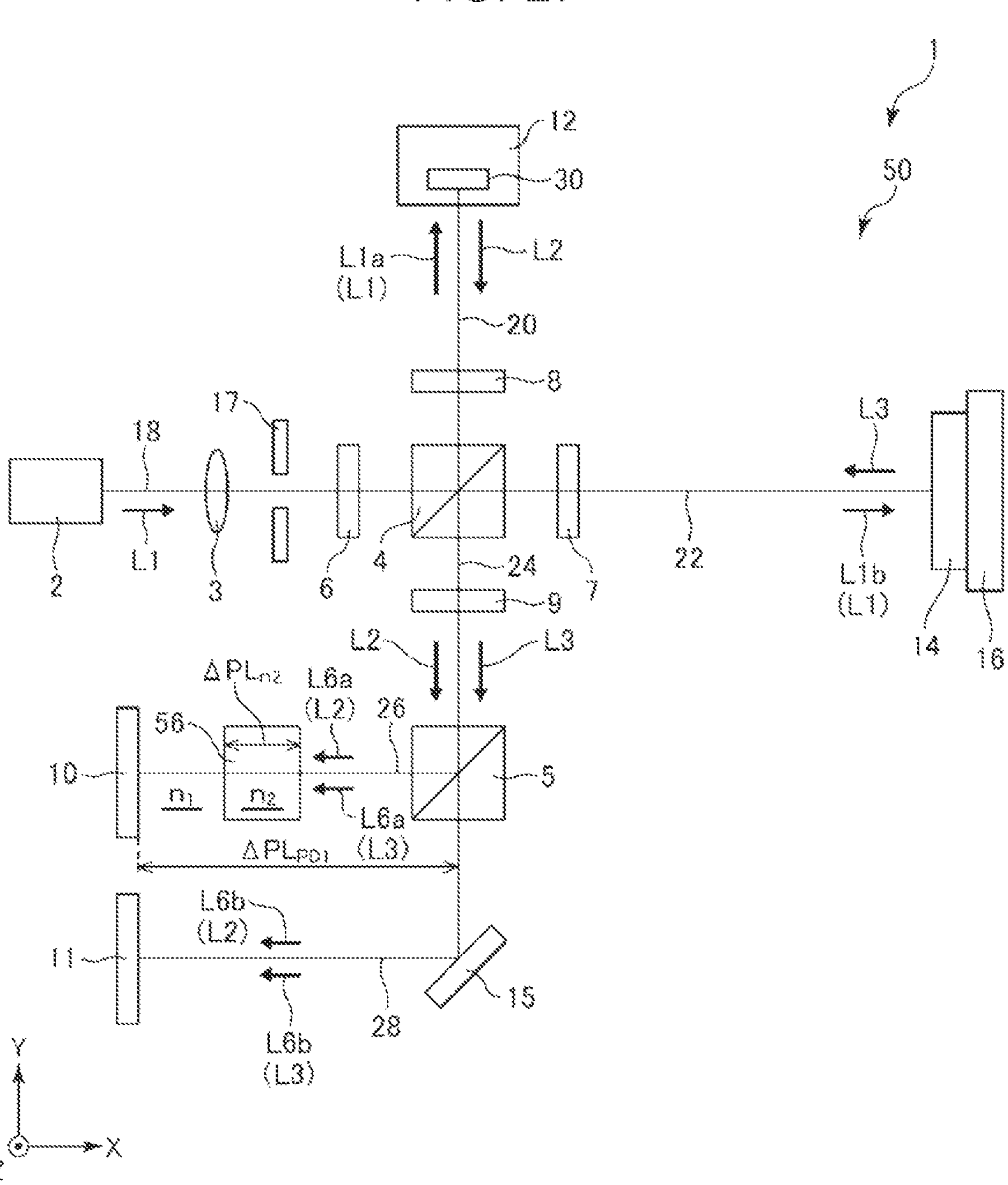
FIG. 27 is a schematic configuration diagram showing an optical system provided in the laser interferometer according to a fourth modification.

FIG. 25 is a schematic configuration diagram showing an optical system included in the laser interferometer 1 according to the second modification. FIG. 26 is a schematic configuration diagram showing an optical system included in the laser interferometer 1 according to the third modification. FIG. 27 is a schematic configuration diagram showing an optical system included in the laser interferometer 1 according to the fourth modification.

Hereinafter, the second to fourth modifications will be described, differences from the above embodiments will be mainly described, and description of the same matters will be omitted in the following description. In FIGS. 25 to 27, the similar components as those of the embodiment described above are denoted by the same reference numerals.

2.1 Second Modification

In the embodiment described above, the optical axes $A_{L2}$ and $A_L3$ are shifted in the Z axis direction. On the other hand, in the second modification, the optical axes $A_{L2}$ and $A_{L3}$ are shifted from each other in an X-Y plane as shown in FIG. 25. Even when directions in which the optical axes $A_{L2}$ and $A_{L3}$ are shifted are different from each other, the effect of the optical axis shift is the same. Therefore, the similar effect as the embodiment described above can be obtained in the second modification.

2.2 Third Modification

In the embodiment described above, the second light splitter 5 includes a polarization beam splitter. On the other hand, in the third modification, the second light splitter 5 includes a triangular prism as shown in FIG. 26. The triangular prism can split interference light into two light beams regardless of a polarization state of the interference light. Therefore, the similar effect as the embodiment described above can be obtained in the third modification.

2.3 Fourth Modification

The fourth modification further includes a reflective element 15. An extending direction of the optical path 28 is changed by the reflective element 15. A physical length between the second light splitter 5 and the second light receiving element 11 is longer than a physical length between the second light splitter 5 and the first light receiving element 10.

As shown in FIG. 27, the laser interferometer 1 according to the fourth modification further includes an optical path length changing unit 56. The optical path length changing unit 56 is disposed on the optical path 26, that is, between the second light splitter 5 and the first light receiving element 10, and changes an optical path length between the second light splitter 5 and the first light receiving element 10.

With such a configuration, an optical path length between the second light splitter 5 and the first light receiving element 10 and an optical path length between the second light splitter 5 and the second light receiving element 11 can be made close to each other by increasing the optical path length of the optical path 26 that passes through the optical path length changing unit 56. Accordingly, even when the physical lengths cannot be brought close to each other due to various problems, the optical path lengths can be brought close to each other. As a result, it is possible to implement the optical system 50 that satisfies the above Formula (C) even when there are various problems.

The optical path length changing unit 56 includes a refractive index variable body that is disposed at a position where the third split light L6*a* is incident and whose refractive index changes.

According to such a configuration, the optical path length of the optical path 26 that passes through the optical path length changing unit 56 can be easily changed by changing the refractive index.

Examples of the refractive index variable body include an optical multilayer filter. An optical path length can be increased even when a film thickness is thin by using a high refractive index material for a multilayer film included in the optical multilayer filter. In the case of a multilayer film, a material and a film thickness of the film can be easily changed, so that a target optical path length can be easily obtained.

A physical length of the optical path length changing unit 56 including the refractive index variable body is $\Delta PL_{n2}$, and a refractive index of the refractive index variable body is $n_2$. A physical length between the second light splitter 5 and the first light receiving element 10 is denoted by $\Delta PL_{PD1}$, and a refractive index of air surrounding the optical path length changing unit 56 is denoted by $n_1$. In this case, a distance $\Delta L_{PD1}$ that is an optical path length between the second light splitter 5 and the first light receiving element 10 is expressed by the following Formula (27).

$$\Delta L_{PD1} = n_1(\Delta PL_{PD1} - \Delta PL_{n2}) + n_2\Delta PL_{n2} \tag{27}$$

In this manner, the similar effect as the embodiment described above can be obtained in the fourth modification.

Although the laser interferometer according to an aspect of the present disclosure has been described above based on the embodiment, the laser interferometer according to an aspect of the present disclosure is not limited to the embodiment described above. A configuration of each part can be replaced with a configuration having the similar function. In addition, any other components may be added to the laser interferometer according to the embodiment described above. In addition, the laser interferometer according to an aspect of the present disclosure may include any two or more of the embodiment described above and the modifications described above.

The laser interferometer according to an aspect of the present disclosure can be applied to, for example, a vibration meter, an inclinometer, a distance meter (a length measuring device), and the like, in addition to the displacement meter or the speedometer described above. Examples of an application of the laser interferometer according to an aspect of the present disclosure include an optical fiber gyro that implements an optical combo interference measurement technique, an angular speed sensor, an angular acceleration sensor, and the like that are capable of performing distance measurement, 3D imaging, spectroscopy, and the like.

Two or more of the laser light source, the optical modulator, the first light receiving element, and the second light receiving element may be mounted on the same substrate. As a result, a size and a weight of the optical system can be easily reduced, and it is easy to perform assembling.

Although a so-called Michelson interference optical system is provided in the embodiment and modifications described above, the laser interferometer according to an aspect of the present disclosure can also be applied to an interference optical system of another type such as a Mach-Zehnder interference optical system.

What is claimed is:

1. A laser interferometer comprising:

a laser light source configured to emit laser light;

a first light splitter configured to split the laser light into first split light and second split light;

an optical modulator including a resonator element, the optical modulator being configured to modulate the first split light into reference light having a different frequency from the first split light by using the resonator element;

a second light splitter configured to reflect a part of interference light, which is between the reference light and object light generated by an object to be measured, to generate third split light and transmit the other part of the interference light to generate fourth split light;

a first light receiving element configured to receive the third split light and output a first light reception signal;

a second light receiving element disposed at a position different from the first light receiving element and configured to receive the fourth split light and output a second light reception signal;

a collimator lens configured to generate collimated light by collimating the laser light; and an oscillation circuit configured to output a reference signal using the resonator element as a signal source, wherein the third split light is incident on the first light receiving element, the fourth split light is incident on the second light receiving element, an optical axis of the first split light that travels from the first light splitter toward the optical modulator is shifted from an optical axis of the reference light that travels from the optical modulator toward the first light splitter, a difference between an optical path length of the third split light from the second light splitter to the first light receiving element and an optical path length of the fourth split light from the second light splitter to the second light receiving element is 20 mm or less, an optical axis of the collimated light is defined as a first optical axis, return light traveling toward the laser light source is generated by the reference light or the object light, and an optical axis of the return light is defined as a second optical axis, a position at which the collimated light is generated in the collimator lens is a reference position, and the first optical axis and the second optical axis are shifted from each other so as to satisfy the following equation (A):

$$\frac{\kappa}{2}+\frac{1}{2}\left(R+\frac{2L}{R}\lambda\right)\leqq\Delta y \tag{A}$$

where Δy is a distance between the first optical axis and the second optical axis at the reference position, wherein Δy is adjusted by inclining the optical modulator, κ is an effective diameter of the collimator lens, R is a light diameter of the collimated light in the collimator lens, L is a distance between the reference position and the optical modulator, and Δ is a wavelength of the collimated light.

2. The laser interferometer according to claim 1, wherein the difference between the optical path length of the third split light from the second light splitter to the first light receiving element and the optical path length of the fourth split light from the second light splitter to the second light receiving element is 10 mm or less.

3. The laser interferometer according to claim 2, wherein the difference between the optical path length of the third split light from the second light splitter to the first light receiving element and the optical path length of the fourth split light from the second light splitter to the second light receiving element is 1 mm or less.

4. The laser interferometer according to claim 1, further comprising:

a light shielding element that is disposed between the laser light source and the first light splitter and that has an opening through which the laser light passes.

5. The laser interferometer according to claim 4, wherein a diameter of the opening is 0.50 mm or more and 1.50 mm or less.

6. The laser interferometer according to claim 5, wherein an optical path length from the optical modulator to the light shielding element is equal to or less than an optical path length from the optical modulator to the first light receiving element.

7. The laser interferometer according to claim 6, further comprising:

an optical path length changing unit that is disposed between the second light splitter and the first light receiving element and that changes the optical path length of the third split light between the second light splitter and the first light receiving element.

8. The laser interferometer according to claim 4, wherein the difference between the optical path length of the third split light from the second light splitter to the first light receiving element and the optical path length of the fourth split light from the second light splitter to the second light receiving element is 8 mm or less.

9. The laser interferometer according to claim 4, wherein an optical path length from the optical modulator to the light shielding element is equal to or less than an optical path length from the optical modulator to the first light receiving element.

10. The laser interferometer according to claim 1, wherein the collimator lens is disposed between the laser light source and the first light splitter, and the laser light source is a semiconductor laser element.

11. The laser interferometer according to claim 1, further comprising:

an optical path length changing unit that is disposed between the second light splitter and the first light receiving element and that changes the optical path length of the third split light between the second light splitter and the first light receiving element.

12. The laser interferometer according to claim 11, wherein the optical path length changing unit includes a refractive index variable body that is disposed at a position where the third split light is incident and whose refractive index changes.

13. The laser interferometer according to claim 1, wherein each of the reference light and the object light traveling through the first light splitter reaches the second light splitter.

14. The laser interferometer according to claim 1, wherein the resonator element includes a diffraction grating.

15. The laser interferometer according to claim 1 further comprising a differential amplifier circuit, wherein the differential amplifier circuit is configured to calculate a difference between the first light reception signal and the second light reception signal and output a differential current.

16. The laser interferometer according to claim 1, further comprising a light shielding element having an opening, wherein an optical axis of the first split light is defined as a third optical axis, an optical axis of the reference light is defined as a fourth optical axis, a diameter of the opening is defined as $\Phi_{pin}$, and $\Phi_{pin}$ satisfies the following equation (B):

$$\frac{\lambda}{\theta'}\leqq\phi_{pin}\leqq\Delta L\theta'-\frac{\lambda}{\theta'} \tag{B}$$

where θ' is an angle formed by the third optical axis and the fourth optical axis, and ΔL is a distance between the light shielding element and the optical modulator.

17. The laser interferometer according to claim 1, further comprising:

a demodulation circuit configured to demodulate, from the first light reception signal and the second light reception signal, a sample signal derived from the object to be measured based on the reference signal.

18. The laser interferometer according to claim 17, wherein the resonator element is plate-shaped and has four sides, a length of one of the four sides is ten times or more than a thickness of the resonator element, and a diffracting grating is formed on a surface of the resonator element.

* * * * *